US009381972B2

(12) United States Patent
Kawakami et al.

(10) Patent No.: US 9,381,972 B2
(45) Date of Patent: Jul. 5, 2016

(54) POWER-ASSISTED BICYCLE

(71) Applicant: Panasonic Intellectual Property Management Co., Ltd., Osaka-shi, Osaka (JP)

(72) Inventors: Masafumi Kawakami, Nara (JP); Munehiro Date, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/624,113

(22) Filed: Feb. 17, 2015

(65) Prior Publication Data

US 2015/0158550 A1 Jun. 11, 2015

Related U.S. Application Data

(63) Continuation of application No. PCT/JP2012/008089, filed on Dec. 19, 2012.

(30) Foreign Application Priority Data

Aug. 17, 2012 (JP) .................................. 2012-180692

(51) Int. Cl.
*B62M 6/55* (2010.01)
*B62M 6/45* (2010.01)

(52) U.S. Cl.
CPC .. *B62M 6/55* (2013.01); *B62M 6/45* (2013.01)

(58) Field of Classification Search
CPC .................................. B62M 6/55; B62M 6/45
See application file for complete search history.

(56) References Cited

U.S. PATENT DOCUMENTS 8,256,554 B2 * 9/2012 Chan ........................ B62M 6/45
180/206.4
8,820,459 B2 * 9/2014 Hashimoto .............. B62M 6/55
180/206.3
9,027,691 B2 * 5/2015 Ishida ...................... B62M 6/50
180/205.3

(Continued)

FOREIGN PATENT DOCUMENTS

EP 0765804 4/1997
EP 2617636 7/2013

(Continued)

*Primary Examiner* — Tony Winner
*Assistant Examiner* — Gabriela C Craciun
(74) *Attorney, Agent, or Firm* — Hamre, Schumann, Mueller & Larson, P.C.

(57) ABSTRACT

A power-assisted bicycle is provided to satisfactorily keep torque detection capability while reducing the pedal force of a pedal during pedaling if a battery has run out. A cylindrical human-power transmission member 28 having a magnetostriction generation portion 31b of a torque sensor 31 is disposed on the outer periphery of a crankshaft 7a. A combined force member 29 for combining a human driving force and an auxiliary driving force is disposed on the outer periphery of the crankshaft 7a. An auxiliary-driving-force transmission path from a motor 21 to the combined force member 29 has a deceleration mechanism 25 that includes a plurality of reduction gears 36c and 36d and reduction gear support shafts 36a and 36b. A one-way clutch 37 for interrupting a human driving force is disposed between the reduction gears 36c and 36d and the reduction gear support shafts 36a and 36b.

10 Claims, 15 Drawing Sheets

(56) References Cited

U.S. PATENT DOCUMENTS

| | | | | |
|---|---|---|---|---|
| 9,140,342 | B2* | 9/2015 | Hoebel | B62M 6/55 |
| 2012/0010036 | A1* | 1/2012 | Moeller | B62M 6/45 |
| | | | | 475/149 |
| 2012/0186892 | A1* | 7/2012 | Felsl | B62M 1/14 |
| | | | | 180/220 |
| 2012/0247854 | A1* | 10/2012 | Kyoden | B62J 3/00 |
| | | | | 180/206.4 |
| 2013/0075176 | A1* | 3/2013 | Chan | B62M 6/55 |
| | | | | 180/206.4 |

FOREIGN PATENT DOCUMENTS

| | | |
|---|---|---|
| JP | 9-95289 | 4/1997 |
| JP | 10-250673 | 9/1998 |
| JP | 11-189193 | 7/1999 |
| JP | 11-291970 | 10/1999 |
| JP | 2000-164185 | 6/2000 |
| JP | 2005-225489 | 8/2005 |
| JP | 2009-208710 | 9/2009 |
| JP | 4959858 B | 6/2012 |

* cited by examiner

POWER-ASSISTED BICYCLE

TECHNICAL FIELD

The present invention relates to a power-assisted bicycle that can travel with a combination of a human driving force generated by a pedal force from a pedal and an auxiliary driving force generated by a motor.

BACKGROUND ART

In a known power-assisted bicycle including a motor, power is fed from a power storage such as a battery, a human driving force, which includes a pedal force applied to a pedal, is detected by a torque sensor, and an auxiliary driving force (assisting force) of the motor is added according to the human driving force. Thus, such a power-assisted bicycle can smoothly travel on an uphill or the like.

In such a power-assisted bicycle, a motor drive unit including a motor is disposed near a crankshaft. Moreover, the power-assisted bicycle configured thus has a relatively heavy motor drive unit that is disposed at a low position at the center of the power-assisted bicycle (that is, the intermediate point between the front wheel and the rear wheel) in the longitudinal direction. Thus, the front and rear wheels of the power-assisted bicycle configured thus can be more easily lifted than a power-assisted bicycle having a motor in the hub of the front or rear wheel. Such a power-assisted bicycle can easily pass over a step of a path, achieving ease of handling and high traveling stability.

Motor drive units to be provided in such a power-assisted bicycle are broadly classified into a so-called double-shaft motor drive unit 100 that includes, as shown in FIG. 14, an auxiliary driving force output sprocket 103 that outputs an auxiliary driving force from a motor in addition to a driving sprocket (also called a front sprocket or a chain sprocket) 102 serving as a human driving force output wheel disposed at one end of a crankshaft 101, and a so-called single-shaft motor drive unit 200 shown in FIGS. 15 and 16 in which a human driving force generated by a pedal force and an auxiliary driving force generated by a motor are combined and the resultant force is outputted from a driving sprocket 201.

The double-shaft motor drive unit 100 is disclosed in, for example, Patent Literature 1. As shown in FIG. 14, the auxiliary driving force output sprocket 103 is provided in such a manner as to protrude to the outside of a unit case 104 of the motor drive unit 100 from a portion behind the driving sprocket 102 of the motor drive unit 100. The driving sprocket 102 that outputs a human driving force and the auxiliary driving force output sprocket 103 that outputs an auxiliary driving force are engaged with a chain 105 serving as an endless driving force transmission member. The human driving force and the auxiliary driving force are combined by the chain 105 and then are transmitted to the rear wheel.

Further behind the auxiliary driving force output sprocket 103, a tensioner device (also called a guide device) 106 is provided in engagement with the chain 105, which has been engaged with the auxiliary driving force output sprocket 103, so as to guide the chain 105 downward. Moreover, a tension sprocket 107 provided in the tensioner device 106 increases the winding angle of the chain 105 engaged with the auxiliary driving force output sprocket 103.

Meanwhile, the single-shaft motor drive unit 200 is disclosed in, for example, Patent Literature 2. As shown in FIGS. 15 and 16, the outer periphery of a crankshaft 202 that receives a human driving force transmitted from the pedal has a cylindrical human-power transmission member 203 that receives the human driving force transmitted by serration coupling and so on, and a combined force member 205 where the human driving force transmitted via the human-power transmission member 203 is combined with an auxiliary driving force from a motor 204. Subsequently, the human driving force from the human-power transmission member 203 is transmitted to the combined force member 205 via a one-way clutch 206. A large-diameter gear 205a that receives an auxiliary driving force from the motor 204 via a deceleration mechanism 207 is formed on one end of the combined force member 205, whereas the driving sprocket 201 is attached to the other end of the combined force member 205, the driving sprocket 201 serving as a driving force output wheel engaged with a chain 208 serving as an endless driving force transmission member. A resultant force on the combined force member 205 is transmitted from the driving sprocket 201 to the rear wheel through the chain 208.

As shown in FIGS. 15 and 16, the single-shaft motor drive unit 200 is configured such that only the driving sprocket 201 is engaged with the chain 208 and the resultant force of a human driving force and an auxiliary driving force is transmitted to the chain 208. In contrast, the double-shaft motor drive unit 100 needs to engage, as shown in FIG. 14, the driving sprocket 102 for transmitting a human driving force, the auxiliary driving force output sprocket 103 for transmitting an auxiliary driving force, and the tension sprocket 107 with the chain 105.

Thus, the area of the single-shaft motor drive unit 200 in side view (laterally projected area) can be advantageously smaller (compactor) than that of the double-shaft motor drive unit 100 by devising the layout of the motor 204 and the deceleration mechanism 207. A so-called front derailleur can be easily attached to the single-shaft motor drive unit 200 including the driving sprocket 201 with multiple stages. On the other hand, in the double-shaft motor drive unit 100, the driving sprocket 102, the auxiliary driving force output sprocket 103, and the tension sprocket 107 need to be engaged with the chain 105, leading to difficulty in attaching the front derailleur. Moreover, the single-shaft motor drive unit 200 advantageously eliminates the need for providing the tensioner device 106 of the tension sprocket 107 or the like.

Typically, in the advantageous single-shaft motor drive unit 200, a magneto-striction torque sensor 209 for detecting a human driving force is provided on the outer periphery of the human-power transmission member 203, which receives a human driving force transmitted from the crankshaft 202, and a portion opposed to the outer periphery. Specifically, a magneto-striction generation portion is formed on the outer periphery of the human-power transmission member 203, and a coil 209a for detecting a change of magnetism on the magneto-striction generation portion is opposed to the magneto-striction generation portion. When the right and left pedals are pressed, the crankshaft 202 is twisted by a pedal force (human driving force). Thus, the twisted state of the human-power transmission member 203 that receives a human driving force transmitted from the crankshaft 202 is detected by the torque sensor 209.

The magneto-striction generation portion of the torque sensor 209 is formed on the outer periphery of the human-power transmission member 203 while the one-way clutch 206 is attached to the end of the human-power transmission member 203 as discussed above. The one-way clutch 206 is provided for the following reason: even if a rider stops pedaling on such a conventional power-assisted bicycle, the motor 204 is controlled so as to keep rotating for a while (so-called delay control). In this case, the absence of the one-way clutch 206 may transmit an auxiliary driving force from the motor 204 to the crankshaft 202, causing the pedals to rotate without being pedaled by the rider. Thus, the one-way clutch 206 interrupts an auxiliary driving force from the motor 204 so as not to apply such a force to the crankshaft 202 or the pedals.

As shown in FIG. 16, a one-way clutch 210 is also provided between a rotating shaft 204a and a rotor 204b of the motor 204 in the single-shaft motor drive unit 200. If a battery for driving the motor 204 has run out during pedaling, the one-way clutch 210 eliminates the need for rotating the rotor 204b of the motor 204. Specifically, if the battery has run out during pedaling, the absence of the one-way clutch 210 rotates the rotor 204b of the motor 204 with a pedal force of the pedal. Thus, the cogging torque or the like of the motor 204 requires a large force for rotating the pedals (a so-called drag resistance). To address this problem, the one-way clutch 210 is provided to eliminate the need for rotating the rotor 204b of the motor 204. This eliminates the need for applying an excessive force generated by, for example, the cogging torque of the motor 204.

Patent Literature 3 discloses an example of a single-shaft motor drive unit. As shown in FIG. 17, a single-shaft motor drive unit 250 includes a cylindrical combined force member 255 disposed on the outer periphery of a crankshaft 251 that receives a human driving force transmitted from the pedal. The combined force member 255 receives a human driving force transmitted from the crankshaft 251 through a one-way clutch 252 attached to one end of the combined force member 255 and receives an auxiliary driving force transmitted from a motor 253 through a toothed belt for driving force transmission 261, a deceleration mechanism 254 or the like. Moreover, a large-diameter gear 259 engaged with an output gear 254a of the deceleration mechanism 254 is attached to another one-way clutch 258 near the other end of the combined force member 255. An auxiliary driving force from the motor 253 is transmitted to the combined force member 255 through the deceleration mechanism 254, the large-diameter gear 259, and the one-way clutch 258, and then a resultant force combined on the combined force member 255 is transmitted from a driving sprocket 257 to the rear through a chain 256.

In the single-shaft motor drive unit 250, a magneto-striction generation portion is formed on the outer periphery of the combined force member 255 that receives a human driving force transmitted from the crankshaft 251 and an auxiliary driving force transmitted from the motor 253, and magneto-striction torque sensors 260 are provided. The torque sensor 260 has a coil that is opposed to the magneto-striction generation portion to detect a change of magnetism on the magneto-striction generation portion. When the right and left pedals are pressed, the crankshaft 251 is twisted and thus the twisted state of the combined force member 255 that receives a human driving force transmitted from the crankshaft 251 is detected by the torque sensor 260.

In the single-shaft motor drive unit 250 of FIG. 17, the one-way clutch 252 is attached to the one end of the combined force member 255. Thus, even if a rider stops pedaling, the motor 253 keeps rotating for a while. Also in this case, an auxiliary driving force from the motor 253 is interrupted by the one-way clutch 252 so as not to be applied to the crankshaft 251 or the pedals.

CITATION LIST

Patent Literatures

Patent Literature 1: Japanese Patent Laid-Open No. 2009-208710

Patent Literature 2: Japanese Patent Laid-Open No. 10-250673

Patent Literature 3: Japanese Patent Laid-Open No. 9-95289

SUMMARY OF INVENTION

Technical Problem

In the single-shaft motor drive unit 200 shown in FIG. 16, however, the one-way clutch 210 is provided between the rotating shaft 204a and the rotor 204b of the motor 204. Thus, if the battery for driving the motor 204 has run out, pedaling does not need to rotate the rotor 204b of the motor 204, whereas a pedal force from the pedal (human driving force) rotates the rotating shaft 204a of the motor 204 and a large-diameter gear 207a of the deceleration mechanism 207 engaged with the rotating shaft 204a. Hence, if the battery has runs out and does not apply an auxiliary driving force, a reduction in the pedal force of the pedal (human driving force) is small during pedaling, causing a load on a rider.

To address this problem, the single-shaft motor drive unit 250 shown in FIG. 17 includes the one-way clutch 258 between the combined force member 255 and the large-diameter gear 259. If a battery for driving the motor 253 has run out, pedaling does not need to rotate the motor 253, a reduction large gear 254b, a reduction gear shaft 254c, and the output gear 254a of the deceleration mechanism 254, and the large-diameter gear 259 that is engaged with the output gear 254a. Hence, if the battery has run out, the pedal force of the pedal (human driving force) is considerably reduced during pedaling, leading to a considerable decrease in load to a rider.

In the single-shaft motor drive unit 250 in FIG. 17, however, the one-way clutch 258 is assembled into the combined force member 255, thereby directly transmitting vibrations to the combined force member 255 including the torque sensor 260 during a switching operation of the one-way clutch 258 and during an engaging operation and a riding operation of a cam. This may cause noise during torque detection so as to reduce the torque detection capability.

The present invention has been devised to solve the problem. An object of the present invention is to provide a power-assisted bicycle including a so-called single-shaft motor drive unit that can keep, if a battery has run out, high torque detection capability while relatively greatly reducing the pedal force of the pedal (human driving force) during pedaling.

Solution to Problem

In order to solve the problem, the present invention is a power-assisted bicycle capable of traveling with a combination of a human driving force generated by a pedal force from a pedal and an auxiliary driving force generated by a motor, the power-assisted bicycle being configured such that a cylindrical human-power transmission member is disposed on the outer periphery of a crankshaft that receives a human driving force from the pedal, the human-power transmission member receiving the transmitted human driving force and having the magneto-striction generation portion of a torque sensor for detecting the human driving force, a combined force member that combines the human driving force transmitted through the human-power transmission member and an auxiliary driving force from the motor is disposed on the outer periphery of the crankshaft, and a resultant force of the human driving force and the auxiliary driving force that are combined by the combined force member is transmitted to a rear wheel through a driving force output wheel coaxial with the crankshaft and an endless driving force transmission member looped over the human driving force output wheel, the power-assisted bicycle including: a deceleration mechanism disposed on an auxiliary-driving-force transmission path from the motor to the combined force member, the deceleration mechanism having a plurality of reduction gears and a reduction gear support shaft that supports the reduction gears, and a one-way clutch disposed for interrupting a human driving force between one of the reduction gears and the reduction gear support shaft without transmitting a human driving force from the combined force member to the motor.

With this configuration, if the pedals are pressed and rotated when a battery runs out, the one-way clutch for interrupting a human driving force between the reduction gear and the reduction gear support shaft eliminates the need for rotating the reduction gears and the motor. Thus, it is not necessary to apply an excessive force to the pedals. Moreover, the one-way clutch for interrupting a human driving force is provided between one of the reduction gears and the reduction gear support shaft in the deceleration mechanism so as not to come into contact with the combined force member. This does not directly transmit vibrations to the combined force member including the torque sensor during a switching operation of the one-way clutch for interrupting a human driving force and during an engaging operation and a riding operation of a cam, thereby keeping high torque detection capability.

According to the present invention, the deceleration mechanism includes a reduction gear having a reduction large-diameter gear, a reduction gear large-diameter support shaft, a reduction small-diameter gear, and a reduction gear small-diameter support shaft, and a one-way clutch is disposed between the reduction large-diameter gear and the reduction gear large-diameter support shaft.

According to the present invention, the reduction small-diameter gear and the reduction gear small-diameter support shaft are separate parts, the reduction small-diameter gear being integrated with the reduction gear small-diameter support shaft.

With this configuration, the reduction small-diameter gear and the reduction gear small-diameter support shaft are separate parts that are assembled into a single unit by, for example, press-fitting the reduction small-diameter gear to the reduction gear small-diameter support shaft. This can engage the gear of the combined force member substantially over the width of the reduction small-diameter gear, thereby minimizing the thickness of the reduction gear.

A one-way clutch may be provided instead between the reduction small-diameter gear and the reduction gear small-diameter support shaft.

According to the present invention, an interlocking cylinder that serves as a separate part of the human-power transmission member is disposed between the human-power transmission member and the combined force member so as to rotate integrally with the human-power transmission member in engagement with the human-power transmission member. A one-way clutch for interrupting an auxiliary driving force is disposed between the interlocking cylinder and the combined force member so as to prevent transmission of an auxiliary driving force from the combined force member to the human-power transmission member and the crankshaft.

With this configuration, even if the motor keeps rotating for a while after a rider stops pedaling, the one-way clutch for interrupting an auxiliary driving force prevents rotations of the crankshaft, a crank arm, the pedals, and so on. Furthermore, the one-way clutch for interrupting an auxiliary driving force is disposed between the interlocking cylinder, which is a separate part of the human-power transmission member, and the combined force member so as not to come into contact with the combined force member. This does not directly transmit vibrations to the combined force member including the torque sensor during a switching operation of the one-way clutch and during an engaging operation and a riding operation of the cam, thereby keeping high torque detection capability.

As has been discussed, instead of the interlocking cylinder, which is a separated part of the human-power transmission member, and the one-way clutch for interrupting an auxiliary driving force, the one-way clutch may not be provided on a driving force transmission path including the crankshaft, the human-power transmission member, and the combined force member. The human-power transmission member and the combined force member may be also rotated in response to the rotation of the crankshaft regardless of the relative rotation direction of the crankshaft and the human-power transmission member and the combined force member. In this configuration, the hub of the rear wheel may have a coaster brake that is activated when the pedals are rotated opposite to the rotation direction of forward traveling.

With this configuration, the one-way clutch is not provided on the driving force transmission path including the crankshaft, the human-power transmission member, and the combined force member. Thus, even if the human-power transmission member includes the magneto-striction generation portion of the torque sensor, vibrations caused by the one-way clutch are not transmitted to the human-power transmission member. This can satisfactorily detect a torque (human driving force). Since the one-way clutch does not need to be assembled to the human-power transmission member, the material of the human-power transmission member can be selected from a wide range of materials and thus a material with high torque detection capability is usable. If a coaster brake is provided on the hub of the rear wheel, the rotation of the crankshaft is always transmitted to the combined force member. When the pedal is rotated opposite to the direction of forward traveling, the rotation is reliably transmitted to the coaster brake, achieving a reliable operation of the coaster brake.

The present invention further includes a rotation detector that detects stop or a reversed rotation of the pedal. The rotation detector is a torque sensor attached to the crankshaft or the cylindrical human-power transmission member connected to the crankshaft. When the rotation detector detects stop or a reversed rotation of the pedal, a control unit stops or brakes the motor. With this configuration, in the case of stop or a reversed rotation of the pedals during traveling, the operation is detected by the torque sensor acting as a rotation detector and then the motor is stopped or braked. This can prevent application of an auxiliary driving force from the motor to the pedal.

According to the present invention, a motor drive unit includes the motor, the combined force member, the deceleration mechanism, and the control unit, and the motor and the control unit overlap each other in side view and are opposed to each other in a width direction in front view.

With this configuration, the area of the motor drive unit in side view (laterally projected area) can be reduced (made more compact), particularly as a single-shaft motor drive unit. The motor and the control unit are opposed to each other in the width direction of the motor drive unit and thus the control unit is hardly affected by heat from the motor so as to keep high reliability.

According to the present invention, the deceleration mechanism includes the reduction gear that has the reduction large-diameter gear, the reduction gear large-diameter support shaft, the reduction small-diameter gear, and the reduction gear small-diameter support shaft. The reduction gear large-diameter support shaft and the reduction gear small-diameter support shaft are integrally formed or integrally rotated as a reduction gear support shaft. The reduction gear support shaft is rotatably supported by bearings on two ends of the reduction gear support shaft in the axial direction.

With this configuration, the reduction gear support shaft that supports the reduction large-diameter gear and the reduction small-diameter gear is rotatably supported by the bearings at the two ends in the axial direction, in a so-called both-end supported state. Thus, the reduction large-diameter gear and the reduction small-diameter gear can be satisfactorily supported in a stable state unlike in a supported state of the reduction gear support shaft at a single point on one side or at the center in the axial direction, in a so-called one-end supported state.

The present invention further includes an oil guard cover that prevents oil filled to a portion of engagement between the gears provided in the deceleration mechanism from being sprayed to the outside.

According to the present invention, the control unit is provided, and the oil guard cover is disposed at a boundary between the deceleration mechanism and the control unit. This configuration can prevent oil of the deceleration mechanism from being sprayed to the control unit, achieving higher reliability. The oil guard cover may be configured such that the motor, the combined force member, the deceleration mechanism, and the control unit are assembled into the motor drive unit and the oil guard cover is integrated with the unit case of the motor drive unit or is formed as a separate part of the unit case of the motor drive unit and is assembled into the unit case.

Advantageous Effects of Invention

According to the present invention, the deceleration mechanism including the multiple reduction gears and the reduction gear support shaft that supports the reduction gears is provided on the auxiliary-driving-force transmission path from the motor to the combined force member. The one-way clutch for interrupting a human driving force is provided between one of the reduction gears and the reduction gear support shaft so as to prevent transmission of a human driving force from the combined force member to the motor. Thus, if the battery has run out, pedaling does not need to rotate the reduction gear and the motor, preventing an excessive force from being applied to the pedal (a so-called dragging resistance can be considerably reduced). Furthermore, this does not directly transmit vibrations to the combined force member including the torque sensor during a switching operation of the one-way clutch for interrupting a human driving force and during an engaging operation and a riding operation of the cam, achieving a highly reliable power-assisted bicycle with high torque detection capability.

Moreover, the reduction small-diameter gear and the reduction gear small-diameter support shaft of the deceleration mechanism are separate parts that are assembled into a single unit by, for example, press-fitting the reduction small-diameter gear to the reduction gear small-diameter support shaft. This can engage the gear of the combined force member substantially over the width of the reduction small-diameter gear, thereby minimizing the thickness of the reduction gear. Accordingly, the motor drive unit can have a small lateral width.

Furthermore, the interlocking cylinder that is a separate part of the human-power transmission member is disposed between the human-power transmission member and the combined force member so as to integrally rotate in engagement with the human-power transmission member. The one-way clutch for interrupting an auxiliary driving force is disposed between the interlocking cylinder and the combined force member so as to prevent transmission of an auxiliary driving force from the combined force member to the human-power transmission member and the crankshaft. With this configuration, even if the motor keeps rotating for a while after a rider stops pedaling, the one-way clutch for interrupting an auxiliary driving force prevents rotations of the crankshaft, the crank arm, the pedals, and so on. Moreover, the one-way clutch is disposed between the interlocking cylinder, which is a separate part of the human-power transmission member, and the combined force member so as not to come into contact with the combined force member. This does not directly transmit vibrations to the combined force member including the torque sensor during a switching operation of the one-way clutch and during an engaging operation and a riding operation of the cam, thereby keeping high torque detection capability.

Moreover, without providing the one-way clutch on the driving-force transmission path including the crankshaft, the human-power transmission member, and the combined force member, the human-power transmission member and the combined force member are also rotated in response to the rotation of the crankshaft regardless of the relative rotation direction of the crankshaft and the human-power transmission member and the combined force member. Hence, a torque (human driving force) can be reliably detected. Since the one-way clutch does not need to be assembled to the human-power transmission member, the material of the human-power transmission member can be selected from a wide range of materials and thus a material with high torque detection capability is usable. This improves the reliability of the power-assisted bicycle. Furthermore, the coaster brake can be reliably provided on the hub of the rear wheel and can be satisfactorily operated.

Moreover, the motor drive unit includes the motor, the combined force member, the deceleration mechanism, and the control unit, and the motor and the control unit overlap each other in side view and are opposed to each other in the width direction in front view. With this configuration, the area of the motor drive unit in side view (laterally projected area) can be reduced (made more compact), particularly as the single-shaft motor drive unit. Moreover, the control unit is hardly affected by heat from the motor so as to keep high reliability.

Moreover, the reduction gear support shaft that supports the reduction large-diameter gear and the reduction small-diameter gear is rotatably supported by the bearings at the two ends in the axial direction, in a so-called both-end supported state. Thus, the reduction large-diameter gear and the reduction small-diameter gear can be satisfactorily supported in a stable state unlike in a supported state of the reduction gear support shaft at a single point on one side or at the center in the axial direction, in a so-called one-end supported state, achieving higher reliability.

The present invention further includes the oil guard cover that prevents oil filled to the engaged portion between the gears provided in the deceleration mechanism from being sprayed to the outside. This configuration can prevent oil of the deceleration mechanism from being sprayed to the control unit, achieving higher reliability. Moreover, the oil guard cover separates the control unit from a portion where the motor and the deceleration mechanism are provided. With this configuration, heat from the motor, which is likely to generate heat, is hardly transmitted to the control unit, thereby preventing the adverse effect of heat from the control unit so as to improve the reliability. The oil guard cover integrated with the unit case can reduce the number of components as compared with the oil guard cover separated from the unit case. If the oil guard cover is a separate part of the unit case, although the number of components increases, the deceleration mechanism can be efficiently assembled while the oil guard cover is detached.

Moreover, the torque sensor attached to the crankshaft or the cylindrical human-power transmission member connected to the crankshaft is used as the rotation detector that detects stop or a reversed rotation of the pedals. This can quickly and reliably detect stop or a reversed rotation of the pedals and eliminate the need for another rotation detector, thereby reducing the manufacturing cost of the power-assisted bicycle.

DESCRIPTION OF EMBODIMENTS

A power-assisted bicycle according to an embodiment of the present invention will be described below with reference to the accompanying drawings.

Figure 1:
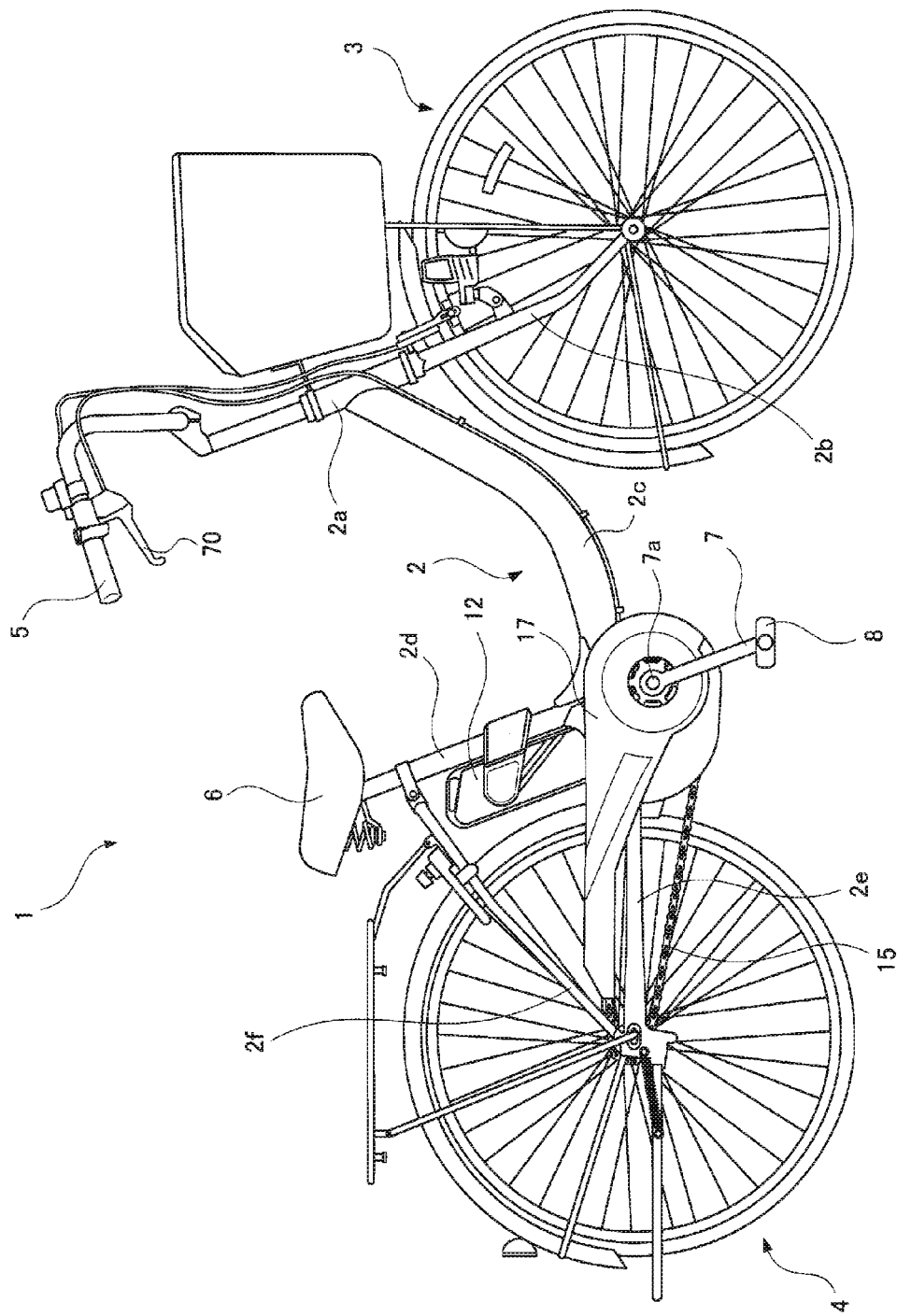
FIG. 1 is an overall side view of a power-assisted bicycle according to a first embodiment of the present invention.
Figure 2:
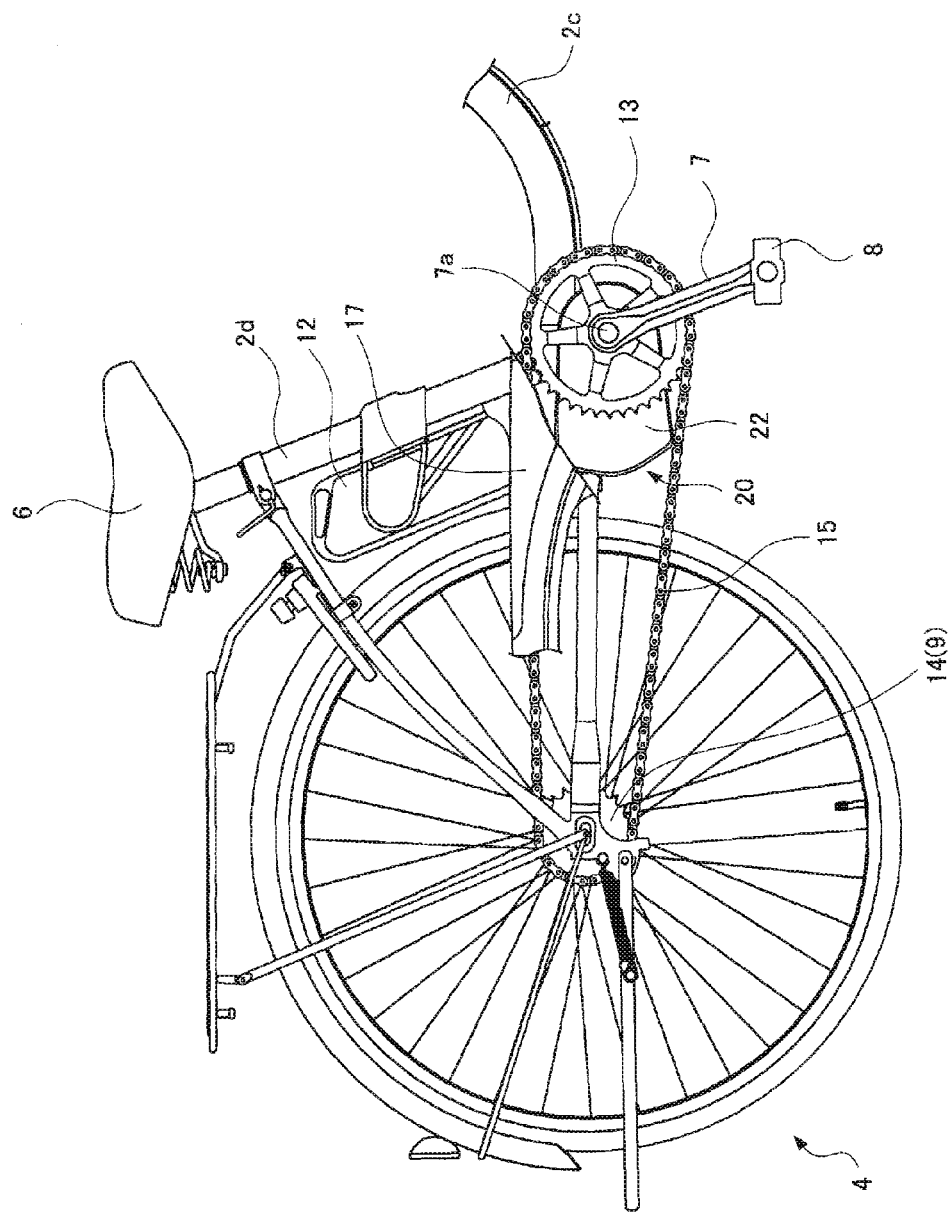
FIG. 2 is a partially cut side view of the power-assisted bicycle.

In FIGS. 1 and 2, reference numeral 1 denotes a power-assisted bicycle according to an embodiment of the present invention. As shown in FIGS. 1 and 2, the power-assisted bicycle 1 includes a metallic frame 2 including a head tube 2a, a front fork 2b, a main tube 2c, a seat tube 2d, a chain stay 2e, and a seat stay 2f, a front wheel 3 rotatably attached to the lower end of the front fork 2b, a rear wheel 4 rotatably attached to the rear end of the chain stay 2e, a handle bar 5 that changes the direction of the front wheel 3, a saddle 6, a crank 7 and pedals 8 that receive a human driving force including a pedal force, a motor drive unit 20 including an electric motor 21 (see FIG. 4) serving as a driving source for generating an auxiliary driving force (assist force) and a control unit 24 (see FIG. 4) for electrically controlling the motor 21 and so on, a battery (power storage) 12 including a secondary battery for supplying driving power to the motor 21, a manual operation part (not shown) that is attached to the handle bar 5 or the like so as to be operated by a rider and so on, a driving sprocket (may be called a front sprocket, a crank sprocket, or a front gear) 13 that is attached so as to coaxially rotate with the crank 7 and serves as a driving force output wheel for outputting the resultant force of a human driving force and an auxiliary driving force, a rear sprocket (may be called a rear gear) 14 serving as a rear wheel attached to a hub (also called a rear hub) 9 of the rear wheel 4, a chain 15 serving as an endless driving force transmission member rotatably wound around the driving sprocket 13 and the rear sprocket 14 in an endless manner, and a chain cover 17 that laterally covers the chain 15 and so on. The battery 12 is an example of a power storage and is preferably a secondary battery. Another example of a power storage may be a capacitor. Reference numeral 70 in FIG. 1 denotes a brake lever attached to the handle bar 5. The brake lever 70 is operated to activate a rim brake, a band brake, or a roller brake (not shown) disposed in the front wheel and the rear wheel.

As shown in FIGS. 1 and 2, also in the power-assisted bicycle, the motor drive unit 20 is disposed at the intermediate position between the front wheel 3 and the rear wheel 4, for example, substantially behind a crankshaft 7a (specifically, under the intermediate position). This configuration locates the relatively heavy motor drive unit 20 at the center of the power-assisted bicycle 1 in the longitudinal direction. Thus, the front wheel 3 and the rear wheel 4 are easily lifted and the power-assisted bicycle can easily pass over a step of a path, achieving ease of handling of the body (e.g., the frame 2) of the power-assisted bicycle 1 and high traveling stability.

Figure 3A:
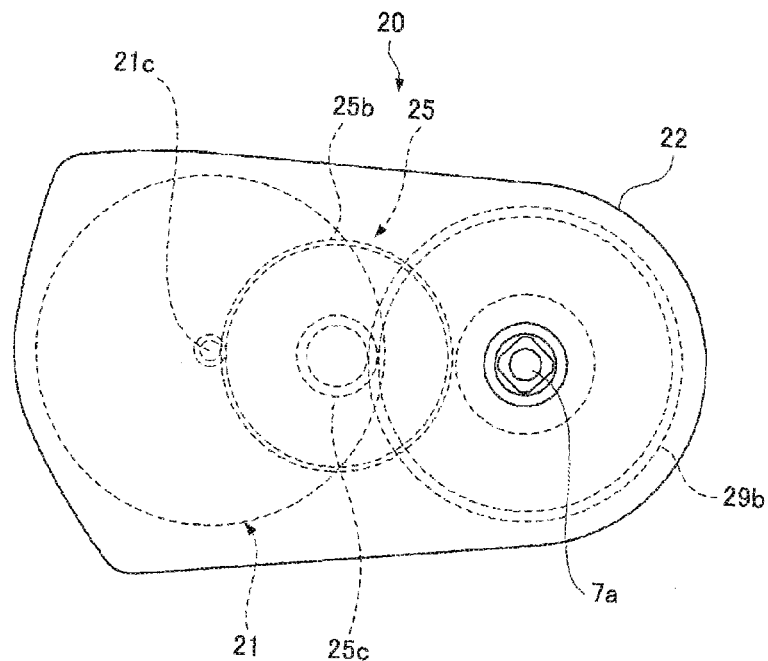
FIG. 3A is a left side view of the motor drive unit of the power-assisted bicycle (a driving sprocket is omitted).
Figure 3B:
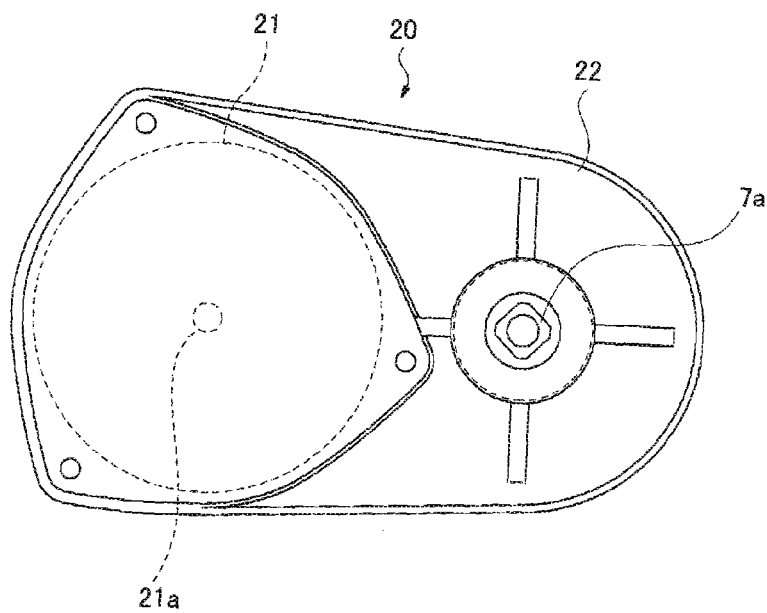
FIG. 3B is a right side view of the motor drive unit of the power-assisted bicycle (a driving sprocket is omitted).
Figure 4:
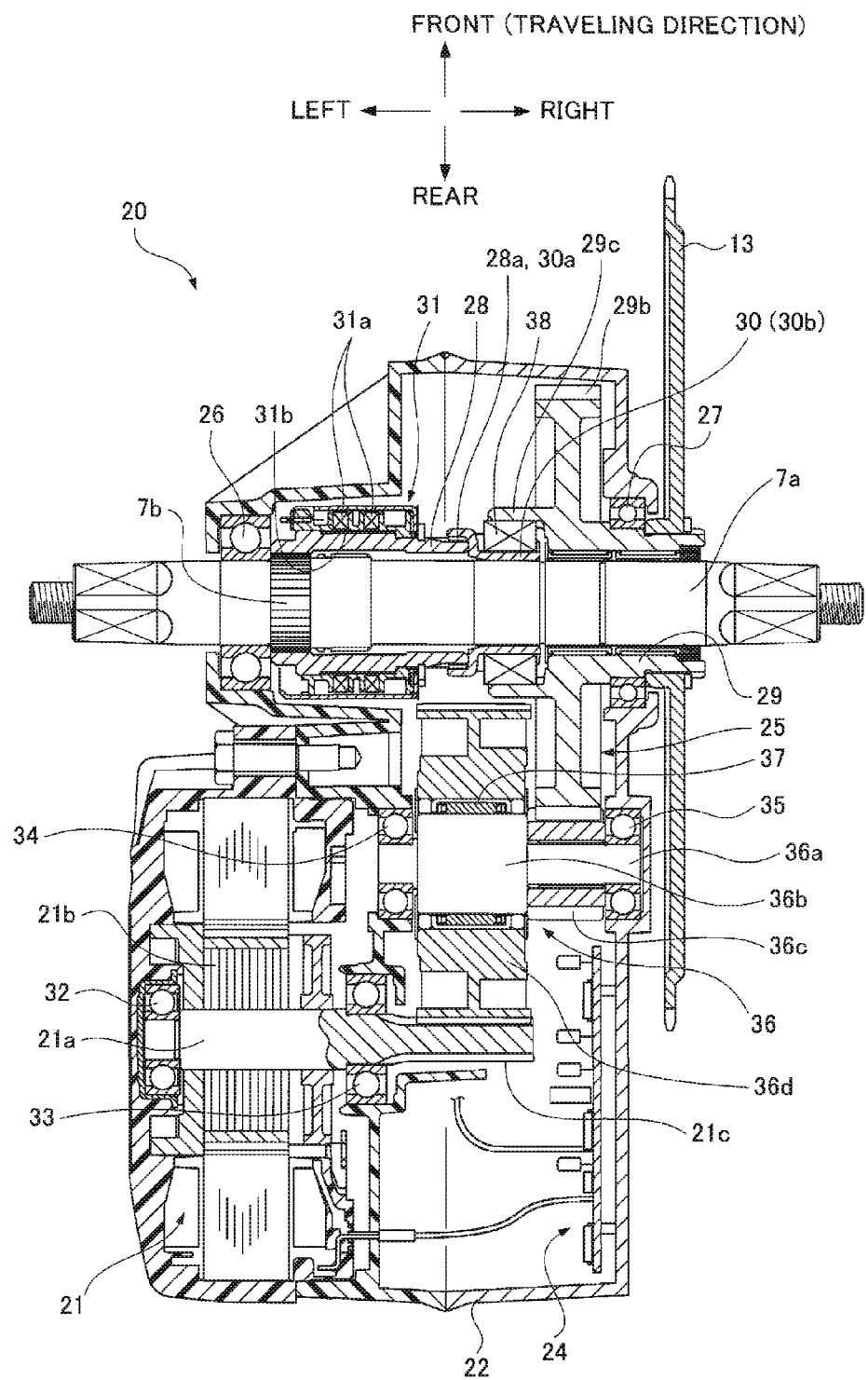
FIG. 4 is a plane section showing the motor drive unit of the power-assisted bicycle.

FIGS. 3A and 3B are left and right side views of the motor drive unit 20 (the driving sprocket 13 is omitted). FIG. 4 is a plane section showing the motor drive unit 20. In the following explanation, a lateral direction and a longitudinal direction are set relative to the traveling direction of a rider on the power-assisted bicycle 1 as shown in FIG. 4. The configuration of the present invention is not limited to these directions.

As shown in FIGS. 3A, 3B, and 4, the motor drive unit 20 includes a unit case 22 constituting a casing and so on. The crankshaft 7a laterally penetrates the front of the motor drive unit 20. Moreover, the outer periphery of the crankshaft 7a has a human-power transmission member 28 that receives a human driving force transmitted from the crankshaft 7a and a combined force member 29 that combines the human driving force transmitted through the human-power transmission member 28 and an auxiliary driving force from the motor 21. Furthermore, a deceleration mechanism 25 including a reduction gear 36 is disposed at the center of the unit case 22 in the longitudinal direction, the motor 21 is disposed on the left side of the rear of the unit case 22, and the control unit 24 is disposed on the right side of the rear of the unit case 22. The control unit 24 includes a control printed circuit board that has electronic components for performing kinds of electrical control and a storage containing kinds of information.

Specifically, as shown in FIG. 4, the crankshaft 7a laterally penetrating the front of the motor drive unit is rotatably disposed with bearings 26 and 27. The cylindrical human-power transmission member 28 is fit onto the center of the outer periphery of the crankshaft 7a in the lateral direction via a serration part 7b such that the human-power transmission member 28 rotates as an integral part. A magneto-striction generation portion 31b having magnetic anisotropy is formed on the outer surface of the human-power transmission member 28. Coils 31a are disposed with a certain clearance (space) on the outer periphery. The magneto-striction generation portion 31b and the coils 31a constitute a magneto-striction torque sensor (human power detection part) 31. With this configuration, a human driving force from the crankshaft 7a is transmitted to the human-power transmission member 28 and is detected by the torque sensor 31. In the magneto-striction torque sensor 31, the magneto-striction generation portion 31b is spirally formed with an angle of, for example, +45° to −45° with respect to the axial direction of the human-power transmission member 28. When a human driving force is transmitted to the human-power transmission member 28, the magneto-striction generation portion 31b on the surface of the human-power transmission member 28 is distorted so as to cause portions thereof to increase or decrease in magnetic permeability. Thus, a difference in the inductance of the coil 31a is measured so as to quickly detect the magnitude of torque (human driving force).

The combined force member 29 for combining a human driving force and an auxiliary driving force is disposed next to the right side of the human-power transmission member 28 on the outer periphery of the crankshaft 7a so as to rotate with respect to the crankshaft 7a. Between the human-power transmission member 28 and the combined force member 29, an interlocking cylinder 30 that integrally rotates in engagement with the human-power transmission member 28 is disposed as a separate part of the human-power transmission member 28. Moreover, a one-way clutch 38 for interrupting an auxiliary driving force is provided between the interlocking cylinder 30 and the combined force member 29 so as to prevent transmission of an auxiliary driving force (rotary force) from the combined force member 29 to the human-power transmission member 28 and the crankshaft 7a. Specifically, a serration part 28a formed on the outer periphery of the right end of the human-power transmission member 28 and a serration part 30a formed on the left cylindrical part of the interlocking cylinder 30 are fit to engage the human-power transmission member 28 with the interlocking cylinder 30 to be integrally rotated. The interlocking cylinder 30 is disposed rotatably with respect to the crankshaft 7a. The one-way clutch 38 for interrupting an auxiliary driving force is disposed between an inner cylindrical part 30b provided on the left side of the interlocking cylinder 30 and the inner periphery of a cylindrical part 29c integrated with the left side of the combined force member 29. The one-way clutch 38 for interrupting an auxiliary driving force is configured so as to interrupt an auxiliary driving force from the motor 21 even if the motor 21 keeps rotating for a while after a rider stops pressing the pedals 8, preventing the application of the auxiliary driving force to the crankshaft 7a and the pedals 8.

Moreover, a large-diameter gear 29b for inputting an auxiliary driving force from the motor 21 is integrated with the outer periphery of the left side of the combined force member 29. The driving sprocket 13 is fit onto the outer periphery of the right end of the combined force member 29 such that the combined force member 29 and the driving sprocket 13 are integrally rotated. The bearing 27 fit onto the combined force member 29 rotatably supports the crankshaft 7a via the combined force member 29. A thin bearing or the like may be further provided between the combined force member 29 and the crankshaft 7a.

The motor 21 has a rotating shaft 21a and a rotor 21b that are rotatably supported by bearings 32 and 33. The rotating shaft 21a of the motor 21 protrudes to the right direction. A toothing part 21c is formed around the protruding part. The deceleration mechanism 25 is configured such that the running torque (auxiliary driving force) of the motor 21 is amplified and is transmitted to the large-diameter gear 29b of the combined force member 29 with the reduction gear 36. In this configuration, a reduction-gear small-diameter support shaft (an example of a reduction-gear support shaft, will be simply abbreviated as a small-diameter support shaft) 36a and a reduction-gear large-diameter support shaft (another example of a reduction-gear support shaft, will be simply abbreviated as a large-diameter support shaft) 36b having a larger diameter than the small-diameter support shaft 36a are integrally formed on the support shaft (reduction-gear support shaft) of the reduction gear 36. Moreover, a reduction small-diameter gear (an example of a reduction gear, will be simply abbreviated as a small-diameter gear) 36c, which is a separate part of the small-diameter support shaft 36a, is assembled to the outer periphery of the small-diameter support shaft 36a so as to integrally rotate with the small-diameter support shaft 36a via a press-fitted or serration part. Two ends of the reduction gear support shaft including the integrated reduction-gear small-diameter and large-diameter support shafts 36a and 36b are rotatably supported by bearings 34 and 35, in a so-called both-end supported state. The small-diameter gear 36c is engaged with the large-diameter gear 29b of the combined force member 29. Meanwhile, a reduction large-diameter gear (another example of the reduction gear, will be simply abbreviated as a large-diameter gear) 36d is disposed on the outer periphery of the large-diameter support shaft 36b of the reduction gear 36, and the large-diameter gear 36d is engaged with the toothing part 21c of the rotating shaft 21a of the motor 21. Between the large-diameter support shaft 36b and the large-diameter gear 36d of the reduction gear 36, a one-way clutch 37 for interrupting a human driving force is provided to prevent transmission of a turning force from the combined force member 29 to the motor 21.

If the inner periphery of the large-diameter gear 36d of the reduction gear 36 is rotated according to a motor output (auxiliary driving force), e.g., a certain auxiliary driving force during traveling is outputted, in a direction that moves forward the driving sprocket 13 relative to the outer periphery of the large-diameter support shaft 36b opposed to the large-diameter gear 36d (if the number of revolutions of the inner periphery of the large-diameter gear 36d of the reduction gear 36 in a forward direction is larger than that of the outer periphery of the large-diameter support shaft 36b, which is opposed to the large-diameter gear 36d, in the forward direction), the one-way clutch 37 operates so as to transmit an auxiliary driving force, which has been transmitted to the large-diameter gear 36d of the reduction gear 36, directly to the large-diameter support shaft 36b. Moreover, the auxiliary driving force is transmitted to the large-diameter gear 29b of the combined force member 29 via the small-diameter support shaft 36a and the small-diameter gear 36c. Thus, a human driving force and an auxiliary driving force are combined in the combined force member 29 and the resultant force is transmitted from the driving sprocket 13 to the rear wheel 4 through the chain 15.

On the other hand, if the inner periphery of the large-diameter gear 36d of the reduction gear 36 is rotated according to a motor output (auxiliary driving force) opposite to the direction that moves forward the driving sprocket 13 relative to the outer periphery of the large-diameter support shaft 36b opposed to the large-diameter gear 36d (if the number of revolutions of the inner periphery of the large-diameter gear 36d of the reduction gear 36 in the forward direction is smaller than that of the outer periphery of the large-diameter support shaft 36b, which is opposed to the large-diameter gear 36d, in the forward direction), for example, if the battery 12 has run out and the pedals 8 are pressed without an auxiliary driving force outputted from the motor 21, an auxiliary driving force transmitted to the large-diameter gear 36d of the reduction gear 36 is interrupted by the one-way clutch 37 and thus is not transmitted to the large-diameter support shaft 36b.

With this configuration, if the battery 12 has run out and the pedals 8 are pressed without an auxiliary driving force outputted from the motor 21, a human driving force rotates the small-diameter gear 36c, the small-diameter support shaft 36a, and the large-diameter support shaft 36b but does not rotate the large-diameter gear 36d and the rotating shaft 21a and the rotor 21b of the motor 21.

With this configuration, when the pedal 8 is pressed during forward traveling, a human driving force according to a pedal force applied to the pedal 8 is transmitted from the crankshaft 7a to the combined force member 29 through the human-power transmission member 28, the interlocking cylinder 30, and the one-way clutch 38 for interrupting an auxiliary driving force, and then the human driving force is detected by the torque sensor 31 provided on the human-power transmission member 28. Moreover, an auxiliary driving force corresponding to the human driving force is transmitted to the combined force member 29 through, for example, the reduction gear 36 of the deceleration mechanism 25, and then a resultant force generated on the combined force member 29 is transmitted from the driving sprocket 13 to the rear wheel 4 through the chain 15. This can facilitate riding on an uphill road and so on with the auxiliary driving force (assist force) applied from the motor according to the human driving force.

If a rider stops pressing the pedals 8 during riding, the rotation of the crankshaft 7a is also stopped. If the motor 21 keeps rotating for a while even after the pedals 8 are stopped, an auxiliary driving force from the motor 21 is transmitted to the combined force member 29 through the deceleration mechanism 25. However, the auxiliary driving force is interrupted by the one-way clutch 38 connected to the combined force member 29 to interrupt the auxiliary driving force. This can prevent the application of an auxiliary driving force to the crankshaft 7a and the pedals 8 through the interlocking cylinder 30 and the human-power transmission member 28.

In these operations, the conventional single-shaft motor drive unit includes the one-way clutch on the end of the human-power transmission member that has the attached torque sensor. Thus, vibrations during a switching operation of the one-way clutch or vibrations during an engaging operation and a riding operation of the cam are directly transmitted to the end of the human-power transmission member or the combined force member. This may cause noise during torque detection, leading to deterioration of torque detection capability. Such deterioration of torque detection capability may cause difficulty in precisely controlling a torque value or quickly controlling a torque value.

In contrast to this configuration, in the embodiment of the present invention, the one-way clutch 38 for interrupting an auxiliary driving force and the one-way clutch 37 for interrupting a human driving force are not in direct contact with the human-power transmission member 28. Thus, even if the magneto-striction generation portion 31b of the torque sensor 31 is provided on the human-power transmission member 28, the transmission of vibrations caused by the one-way clutches 37 and 38 to the human-power transmission member 28 can be minimized. In other words, the one-way clutch 38 for interrupting an auxiliary driving force is attached to the interlocking cylinder 30 that is a separate part of the human-power transmission member 28, thereby reducing vibrations directly transmitted to the human-power transmission member 28. This can satisfactorily detect a torque (human driving force). Moreover, the one-way clutch 37 for interrupting a human driving force is disposed in a part of the deceleration mechanism 25, thereby minimizing the transmission of vibrations caused by the one-way clutch 38 to the human-power transmission member 28.

Since the one-way clutch 38 does not need to be assembled to the human-power transmission member 28, the material of the human-power transmission member 28 can be selected from a wide range of materials and thus a material with high torque detection capability is usable. This allows the use of the magneto-striction generation portion 31b of the torque sensor 31 with improved torque detection.

With this configuration, the reduction gear 36 of the deceleration mechanism 25 is disposed on an auxiliary-driving-force transmission path from the motor 21 to the combined force member 29. The reduction gear 36 includes the small-diameter gear 36c and the large-diameter gear 36d that serve as reduction gears, and the small-diameter support shaft 36a and the large-diameter support shaft 36b that serve as reduction gear support shafts supporting the small-diameter gear 36c and the large-diameter gear 36d. In the present embodiment, the one-way clutch 37 for interrupting a human driving force is provided between the large-diameter gear 36d and the large-diameter support shaft 36b so as to prevent transmission of a human driving force from the combined force member 29 to the motor 21.

With this configuration, if the battery 12 has run out and the pedals 8 are pressed without an auxiliary driving force outputted from the motor 21, a human driving force rotates the small-diameter gear 36c, the small-diameter support shaft 36a, and the large-diameter support shaft 36b but does not rotate the large-diameter gear 36d and the rotating shaft 21a and the rotor 21b of the motor 21. Thus, it is not necessary to apply an excessive force to the pedals 8 (a so-called drag resistance can be considerably reduced). In comparison with the conventional single-shaft motor drive unit shown in FIG. 13, a human driving force does not rotate the large-diameter gear 36d and the rotating shaft 21a of the motor 21, reducing a force for rotating the pedals 8 accordingly.

In the present embodiment, the small-diameter gear 36c and the small-diameter support shaft 36a are separate parts that are integrated during assembly in which the small-diameter gear 36c is press-fit onto the small-diameter support shaft 36a. Thus, the large-diameter gear 29b of the combined force member 29 can be engaged with the substantially overall width of the small-diameter gear 36c. This can minimize the thickness of the reduction gear 36, advantageously allowing the motor drive unit 20 to have a small lateral width.

The two ends of the reduction gear support shaft including the integrated reduction-gear small-diameter and large-diameter support shafts 36a and 36b are rotatably supported by the bearings 34 and 35, in a so-called both-end supported state.

With this configuration, the reduction large-diameter gear and the reduction small-diameter gear can be satisfactorily supported in a stable state substantially without vibrations and with sufficient strength unlike in a supported state of the reduction gear support shaft at a single point on one side or at the center in the axial direction, in a so-called one-end supported state, achieving higher reliability.

In the present embodiment, as shown in FIG. 4, the motor 21 and the control unit 24 substantially overlap each other in side view. Thus, the area of the motor drive unit 20 in side view (laterally projected area) can be advantageously reduced (made more compact), particularly as the single-shaft motor drive unit 20. The motor 21 and the control unit 24 are opposed to each other in the width direction of the motor drive unit 20 (the motor 21 is disposed on the left side while the control unit 24 is disposed on the right side). Thus, the control unit 24 is hardly affected by heat from the motor 21 so as to keep high reliability.

In the present embodiment, the one-way clutch 37 for interrupting a human driving force is disposed between the large-diameter gear 36d and the large-diameter support shaft 36b. Instead of this, the one-way clutch 37 for interrupting a human driving force may be disposed between the small-diameter gear 36c and the small-diameter support shaft 36a.

Figure 5:
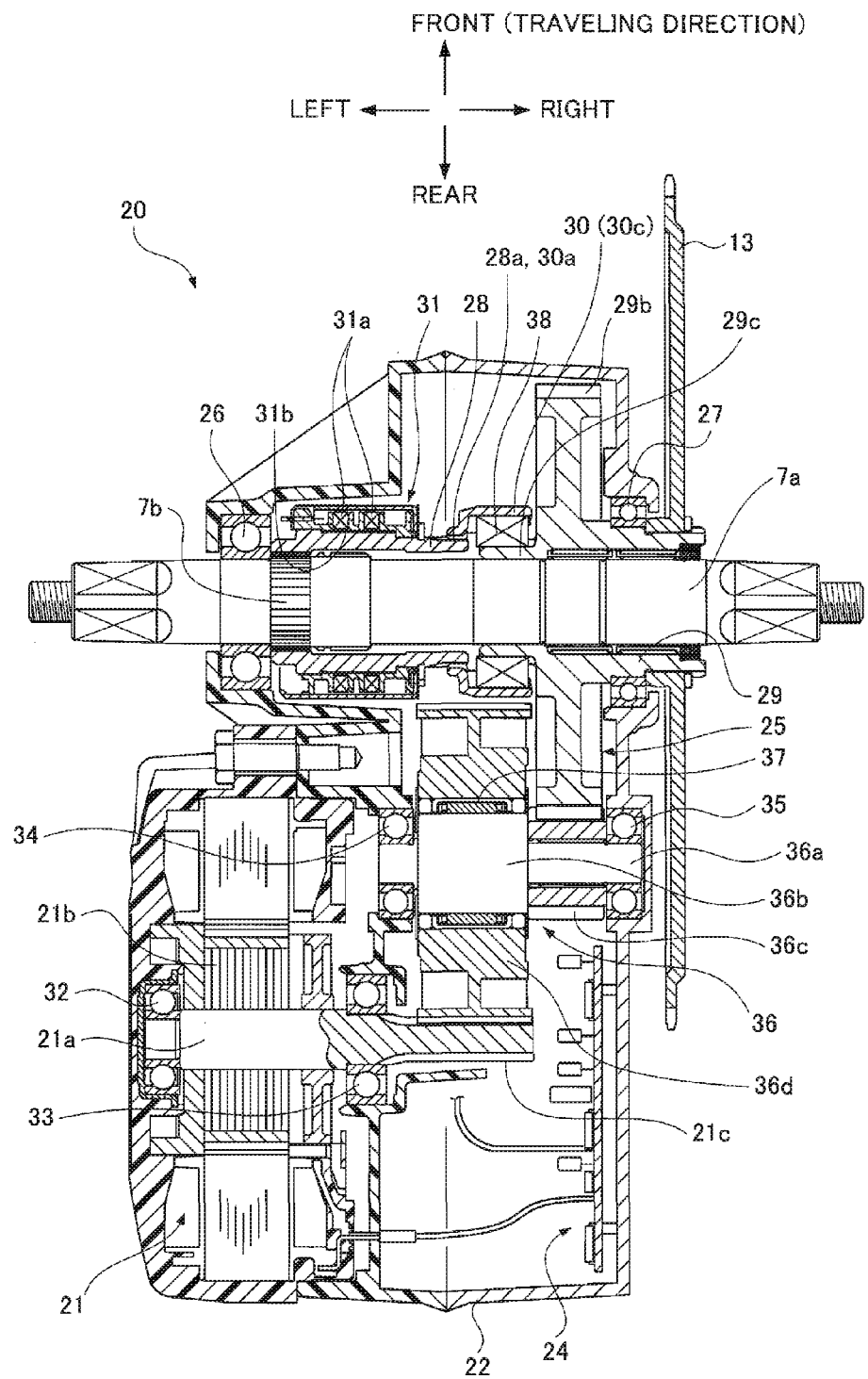
FIG. 5 is a cross-sectional plan view showing the motor drive unit of a power-assisted bicycle according to a modification of the first embodiment of the present invention.

Moreover, in the present embodiment, the inner periphery of the one-way clutch 38 for interrupting an auxiliary driving force is held by the inner cylindrical part 30b of the interlocking cylinder 30 while the outer periphery of the one-way clutch 38 for interrupting an auxiliary driving force is held by the cylindrical part 29c of the combined force member 29. However, the present embodiment is not limited to this configuration. As shown in FIG. 5, the outer periphery of the one-way clutch 38 for interrupting an auxiliary driving force may be held by an outer cylindrical part 30c of the interlocking cylinder 30 while the inner periphery of the one-way clutch 38 for interrupting an auxiliary driving force may be held by the cylindrical part 29c of the combined force member 29. In this case, however, the connection and interruption of the one-way clutch 38 for interrupting an auxiliary driving force is opposite to those of FIG. 4.

A power-assisted bicycle according to a second embodiment of the present invention will be described below with reference to the accompanying drawings.

Figure 6:
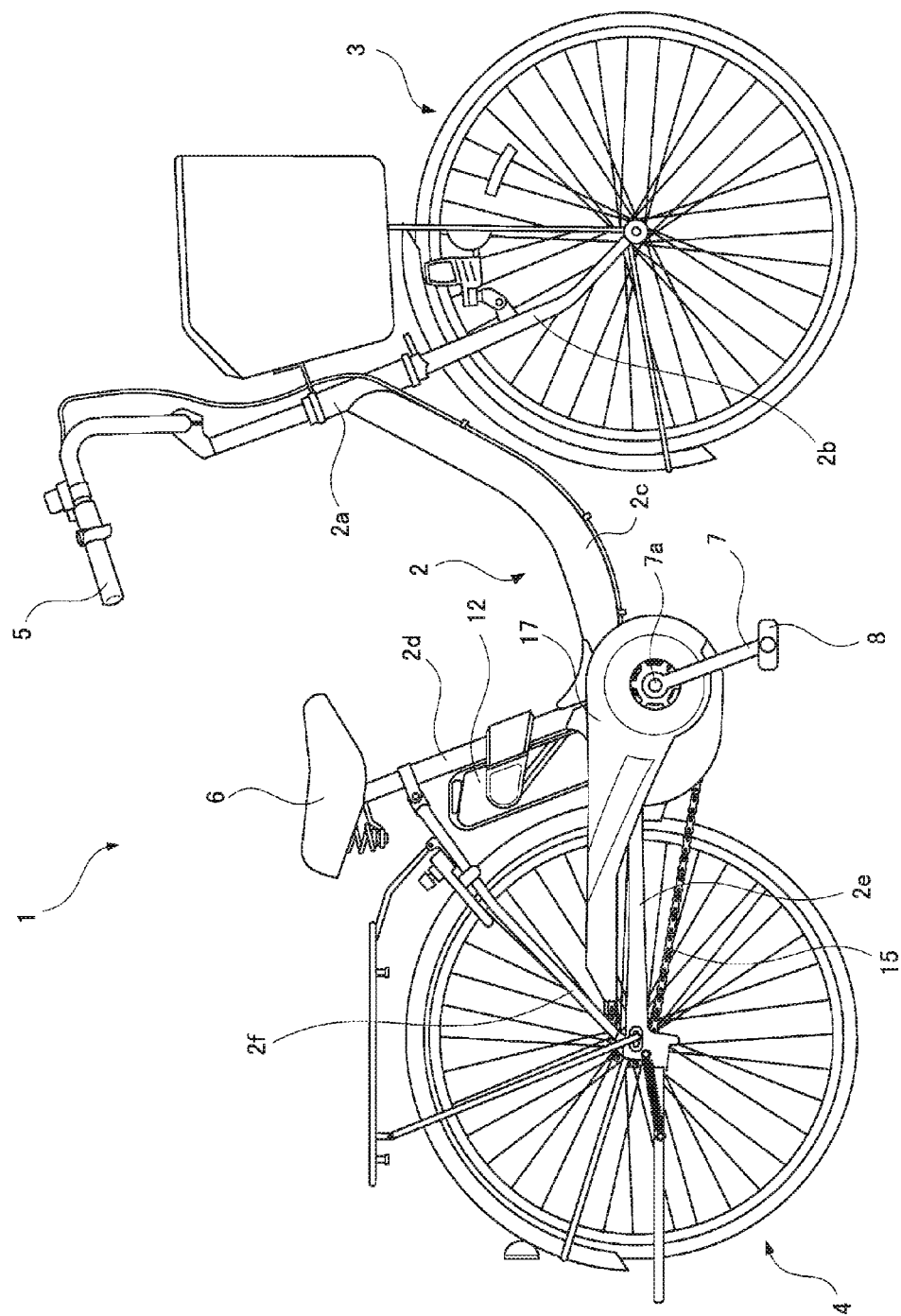
FIG. 6 is an overall side view of a power-assisted bicycle according to a second embodiment of the present invention.
Figure 7:
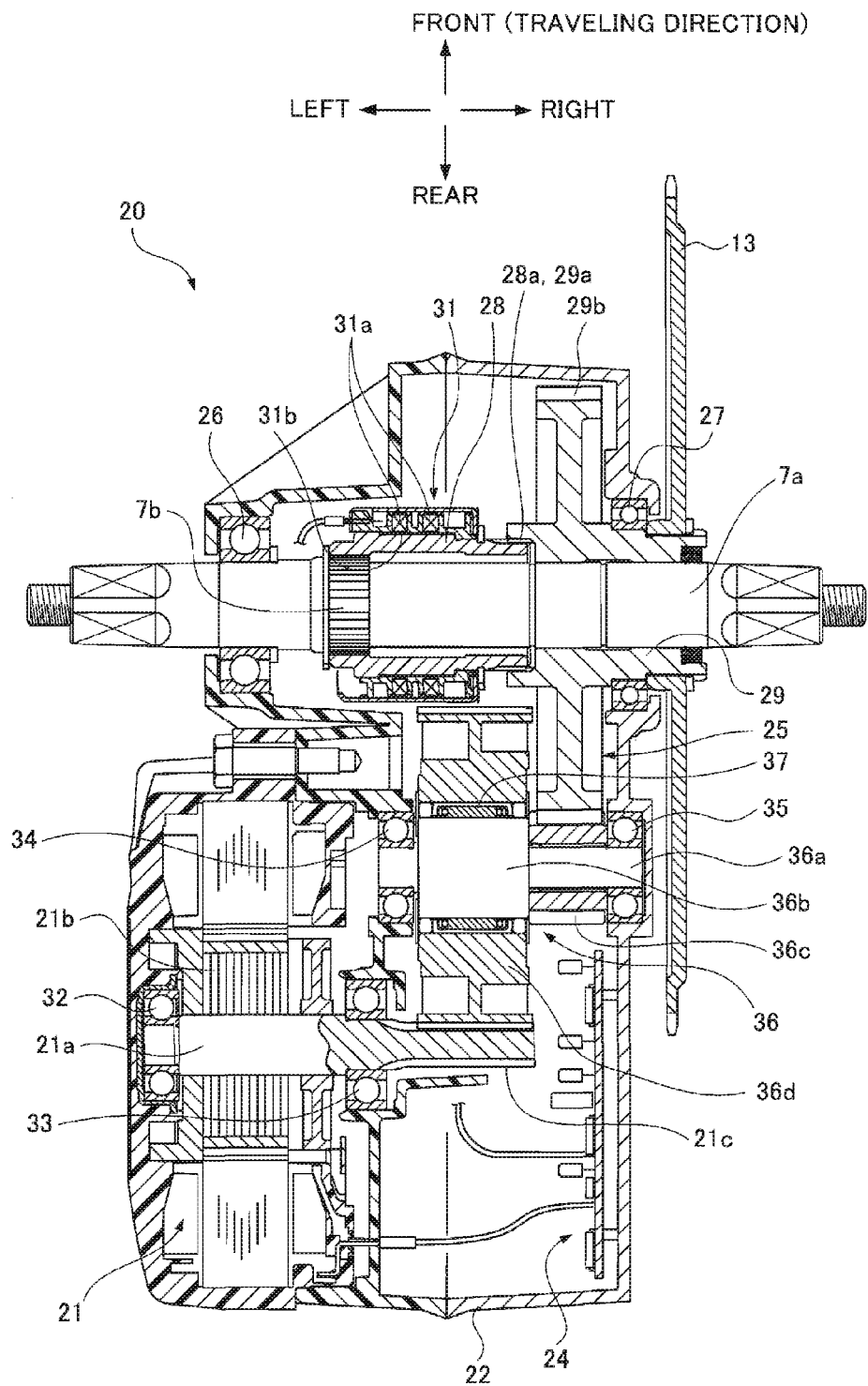
FIG. 7 is a cross-sectional plan view showing the motor drive unit of the power-assisted bicycle according to the second embodiment of the present invention.
Figure 8:
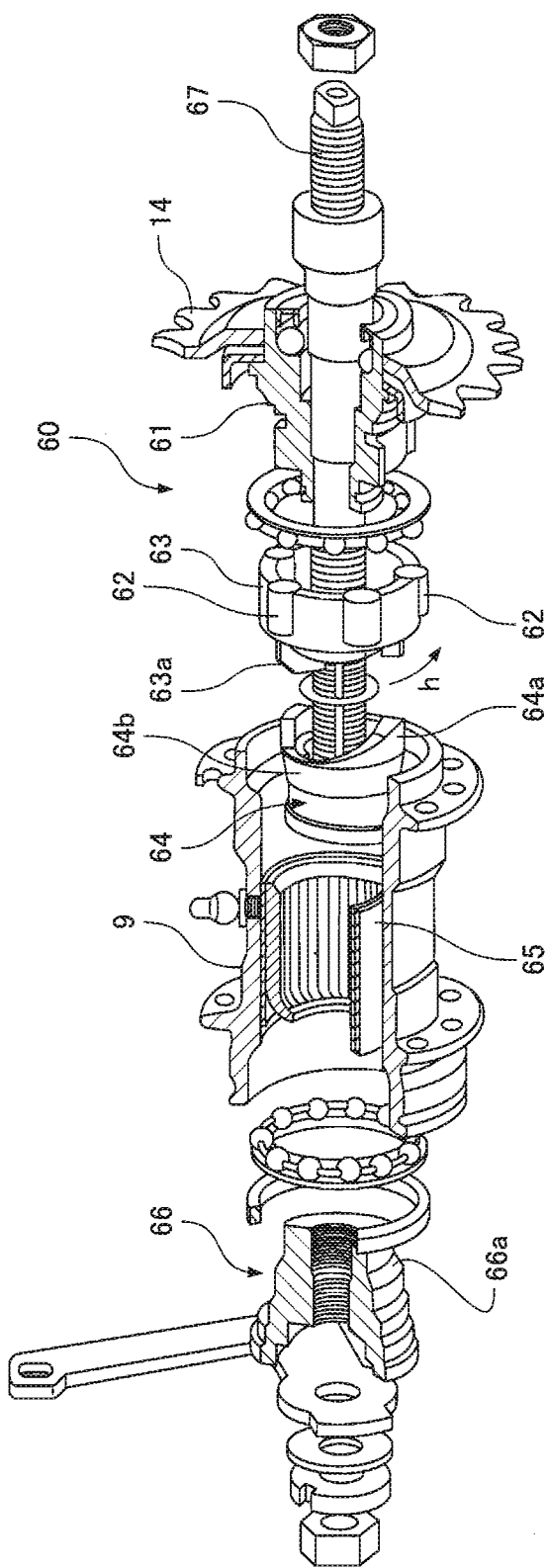
FIG. 8 is an exploded perspective view showing the hub of the rear wheel of the power-assisted bicycle.

FIG. 6 is an overall side view of the power-assisted bicycle according to the second embodiment of the present invention. FIG. 7 is a cross-sectional plan view showing the motor drive unit of the power-assisted bicycle. FIG. 8 is an exploded perspective view showing the hub of the rear wheel of the power-assisted bicycle. Moreover, a partially cut side view of the power-assisted bicycle and the cross-sectional plan view of the motor drive unit according to the present embodiment are identical to FIGS. 2, 3(a), and 3(b) and thus reference is also preferably made to these drawings.

As shown in FIG. 6, in a power-assisted bicycle 1 according to the second embodiment, as the braking device of a rear wheel 4 is not provided the brake lever 70 shown in FIG. 1, a rim brake for pressing a brake shoe, which is activated in response to an operation of a brake lever, to the rim of a front wheel, or a band brake or a roller brake for the rear wheel is not provided as the braking device of a rear wheel 4. Instead of these braking devices, a coaster brake 60 shown in FIG. 8 is provided on a rear hub 9 (see FIG. 2, actually the rear hub 9 is provided behind the rear sprocket 14 shown in FIG. 2). The coaster brake 60 rotates pedals 8 opposite to the rotation direction of forward traveling so as to brake the rear wheel 4. The braking device of a front wheel 3 may be a caliper brake or a rim brake that is activated by operating a brake lever, or the braking device may not be provided (in FIG. 1, the braking device of the front wheel 3 is not provided).

As shown in FIG. 7, the structure of a motor drive unit 20 is only partially different from that of the motor drive unit 20 shown in FIG. 4. In the motor drive unit 20 according to the present embodiment, a difference in the inductance of a coil 31a is measured by a magneto-striction torque sensor 31 attached to a human-power transmission member 28. This can easily and quickly detect the direction of a torque (human driving force), that is, a reversed rotation and a stop of a crankshaft 7a in addition to the magnitude of the torque. Instead of this, the torque sensor may be attached to the crankshaft so as to detect a reversed rotation and a stop of the crankshaft 7a.

A combined force member 29 for combining a human driving force and an auxiliary driving force is disposed next to the right side of the human-power transmission member 28 on the outer periphery of the crankshaft 7a so as to rotate with respect to the crankshaft 7a. A serration part (or a spline part) 28a formed on the outer periphery of the right end of the human-power transmission member 28 and a serration part (or a spline part) 29a formed on the inner periphery of the left end of the combined force member 29 are fit into the combined force member 29. In other words, the motor drive unit 20 according to the present embodiment does not include the interlocking cylinder 30 and the one-way clutch 38 for interrupting an auxiliary driving force according to the foregoing embodiment. Thus, a human driving force transmitted to the crankshaft 7a is transmitted from the human-power transmission member 28 to the combined force member 29 so as to always rotate the crankshaft 7a, the human-power transmission member 28, and the combined force member 29 in an integrated manner. This configuration is different from that of the motor drive unit 20 shown in FIG. 4. Other configurations of the motor drive unit 20 are identical to those of the motor drive unit 20 shown in FIG. 4.

Figure 9:
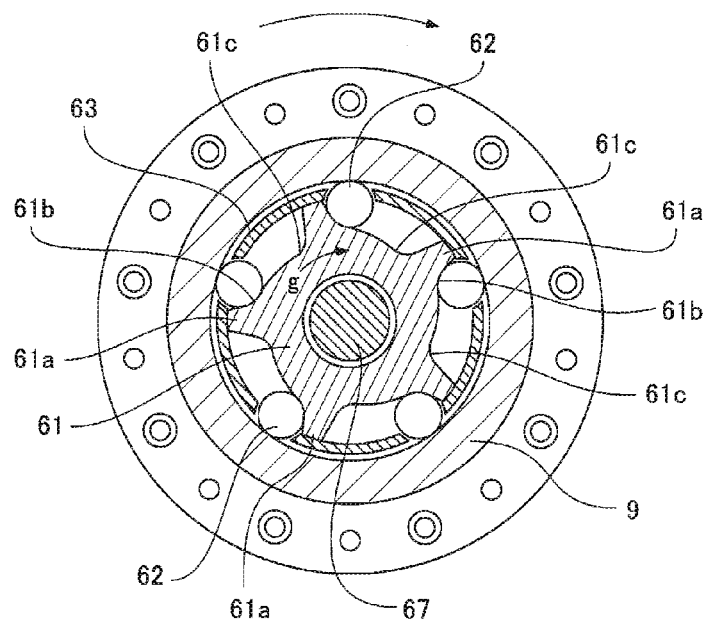
FIG. 9 is a longitudinal section showing the hub of the rear wheel of the power-assisted bicycle, the rear wheel being rotated by a pedal force of pedals.
Figure 10:
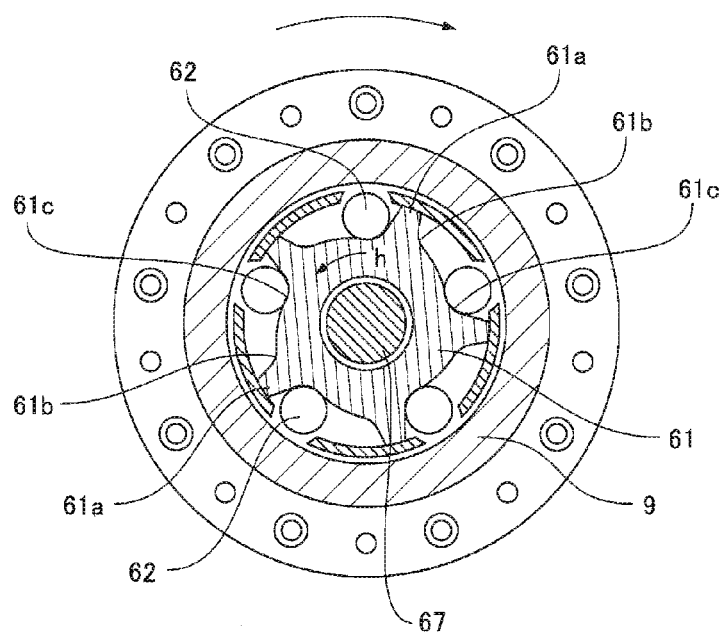
FIG. 10 is a longitudinal section showing the hub of the rear wheel of the power-assisted bicycle with the pedals rotated opposite to forward traveling so as to activate a coaster brake or with the pedals stopped rotating during traveling.

FIG. 8 is the exploded perspective view of the hub (rear hub) 9 of the rear wheel 4 provided with the coaster brake 60. FIGS. 9 and 10 are cross-sectional views of the rear hub. In the present embodiment, the used coaster brake 60 is a "roller clutch driven type" for B-type bicycle coaster hub mechanisms defined by JIS (Japanese Industrial Standards) D9419. The coaster brake 60 is disposed in a hub body that constitutes the casing of the rear hub 9 and rotates integrally with the rear wheel 4.

As shown in FIGS. 8 to 10, the coaster brake 60 is rotatably fit onto a hub shaft 67 of the rear wheel 4, and a rear sprocket 14 is fixed to the outer periphery of one end (the right end in FIG. 8) of the coaster brake 60 so as rotate integrally with the coaster brake 60. The coaster brake 60 includes, on the other end thereof (the left end in FIG. 8), a driver 61 having protrusions 61a, large-diameter cam surfaces 61b, and small-diameter cam surfaces 61c that are circumferentially formed at proper intervals as shown in FIGS. 9 and 10, a cam base 63 that includes rollers 62 circumferentially disposed at proper intervals near the outer periphery of the cam base 63 and a cam portion 63a axially protruding to the left in FIG. 5, an expander 64 including an inclined cam portion 64a, which is engaged with the cam portion 63a of the cam base 63, and a tapered surface 64b, a brake shoe 65 that can be radially increased or reduced in diameter and can be brought into sliding contact with the inner surface of the rear hub 9, and a brake cone 66 having a tapered surface 66a capable of moving the brake shoe 65 to the outside.

If the pedals 8 are rotated in a normal traveling direction (a rotation direction during forward traveling, may be called a forward direction), the driver 61 is rotated via a chain 15 and the rear sprocket 14 in direction g shown in FIG. 9. Accordingly, the rollers 62 are pressed to the outside by the large-diameter cam surfaces 61b of the driver 61. The rollers 62 are thus firmly pressed between the driver 61 and the hub body of the rear hub 9 so as to integrate the hub body with the driver 61. This rotates the overall rear wheel 4. At this point, the cam portion 63a of the cam base 63 is in contact with a thin portion of the inclined cam portion 64a of the expander 64 in the axial direction while the expander 64 is located on the right side in FIG. 8. Thus, the tapered surface 64b of the expander 64 does not come into contact with the brake shoe 65, separating the brake shoe 65 from the inner surface of the rear hub 9 without increasing the diameter of the brake shoe 65.

If the pedals 8 are rotated opposite to the rotation direction of forward traveling so as to reversely rotate the rear sprocket 14 via the chain 15, as shown in FIG. 10, the driver 61 is rotated in the same direction h as the rear sprocket 14. Thus, the locations of the rollers 62 are brought into contact with the small-diameter cam surfaces 61c of the driver 61 with a clearance from the inner surface of the hub body. However, when the rotation of the driver 61 in the direction h rotates the cam base 63 in the direction h via the rollers 62, the expander 64 in contact with the cam portion 63a of the cam base 63 with the inclined cam portion 64a is moved to the left in FIG. 8. Thus, the brake shoe 65 is pressed from both sides by the tapered surface 64b of the expander 64 and the tapered surface 66a of the brake cone 66 with an increasing diameter and is firmly pressed to the inner surface of the hub body of the rear hub 9. This brakes the rear wheel 4 via the rear hub 9.

If the pedals 8 are stopped during traveling and the rotation of the rear sprocket 14 is stopped via the chain 15, a force for rotating the driver 61 in the direction g in FIG. 9 is eliminated. Thus, as shown in FIG. 10, the rollers 62 move to the small-diameter cam surfaces 61c of the driver 61 with a clearance from the inner surface of the rear hub 9. Since the driver 61 is not rotated, the cam base 63 is not rotated and thus the expander 64 stays on the right side in FIG. 8. This does not bring the tapered surface 64b of the expander 64 into contact with the brake shoe 65, separating the brake shoe 65 from the inner surface of the rear hub 9 without increasing the diameter of the brake shoe 65. Consequently, even if the rear hub 9 is rotated, the rotary force of the rear hub 9 is not transmitted to the driver 61 and the rear sprocket 14. This leads to a free-wheeling state as in the provision of a free wheel (a one-way clutch mechanism or a ratchet mechanism) between the rear hub 9 and the driver 61 or the rear sprocket 14, keeping a coasting state.

In the present embodiment, the coaster brake 60 is a "roller clutch driven type". The coaster brake is not limited to this type and thus a "taper cone driven" coaster brake or a "multi-disc" coaster brake may be used instead.

With this configuration, when the pedal 8 is pressed during forward traveling, a human driving force according to a pedal force applied to the pedal 8 is transmitted from the crankshaft 7a to the combined force member 29 through the human-power transmission member 28, and then the human driving force is detected by the torque sensor 31 provided on the human-power transmission member 28. Moreover, an auxiliary driving force corresponding to the human driving force is transmitted to the combined force member 29 through, for example, a reduction gear 36 of a deceleration mechanism 25, and then a resultant force generated on the combined force member 29 is transmitted from a driving sprocket 13 to the rear wheel 4 through the chain 15. This can facilitate riding on an uphill road and so on with an auxiliary driving force (assist force) applied from a motor according to a human driving force.

On the other hand, if a rider stops pressing the pedals 8 during riding, the rotation of the crankshaft 7a is also stopped. Thus, the stopped state is detected by the torque sensor 31 and then a motor 21 is immediately stopped or braked. This can prevent the application of an auxiliary driving force from the motor 21 to the pedal 8, eliminating the need for applying an excessive force to the pedal 8.

If a rider reversely rotates the pedals 8 during riding, the driving sprocket 13 is also reversely rotated accordingly through the crankshaft 7a, the human-power transmission member 28, and the combined force member 29. This operation is transmitted through the chain 15 to the coaster brake 60 including the rear hub 9, activating the coaster brake 60.

In these operations, the conventional single-shaft motor drive unit includes the one-way clutch on the end of the human-power transmission member, which has the attached torque sensor, or the combined force member. Thus, vibrations during a switching operation of the one-way clutch or vibrations during an engaging operation and a riding operation of the cam are directly transmitted to the end of the human-power transmission member or the end of the combined force member. This may cause noise during torque detection, leading to deterioration of torque detection capability. Such deterioration of torque detection capability may cause difficulty in precisely controlling a torque value or quickly controlling a torque value. Even if the coaster brake is provided on the hub of the rear wheel, the rotations of the pedals in forward and backward directions cannot be transmitted to the driving sprocket or the chain. Thus, the conventional single-shaft motor drive unit is not compatible with a coaster brake.

In contrast to this configuration, a one-way clutch is not provided on a driving force transmission path including the crankshaft 7a, the human-power transmission member 28, and the combined force member 29 in the embodiment of the present invention. Thus, even if the human-power transmission member 28 includes a magneto-striction generation portion 31b of the torque sensor 31, vibrations caused by a one-way clutch are not transmitted to the human-power transmission member 28. This can satisfactorily detect a torque (human driving force) so as to improve the reliability of the power-assisted bicycle 1. Since a one-way clutch does not need to be assembled to the human-power transmission member 28, the material of the human-power transmission member 28 can be selected from a wide range of materials and thus a material with high torque detection capability is usable. This allows the use of the magneto-striction generation portion 31b of the torque sensor 31 with improved torque detection.

With the configuration, when a rider stops pressing the pedals 8 or reversely rotates the pedals 8 during riding, this operation is detected by the torque sensor 31 acting as a rotation detector, and then the motor 21 is immediately stopped or braked. This can prevent the application of an auxiliary driving force from the motor 21 to the pedals 8. Moreover, the torque sensor 31 used as the rotation detector can quickly and reliably detect stop or a reversed rotation of the pedals 8 and eliminate the need for another rotation detector. Thus, the manufacturing cost of the power-assisted bicycle 1 can be reduced.

With this configuration, also in the case where the coaster brake 60 is disposed on the hub 9 of the rear wheel 4, a one-way clutch is not provided on the driving force transmission path including the crankshaft 7a, the human-power transmission member 28, and the combined force member 29 and the rotations of the pedals 8 and the crankshaft 7a are always transmitted to the combined force member 29. Thus, when the pedals 8 are rotated opposite to forward traveling, the rotations of the pedals 8 are satisfactorily transmitted to the coaster brake 60, satisfactorily activating the coaster brake 60.

Also in this configuration, the reduction gear 36 of the deceleration mechanism 25 is disposed on an auxiliary-driving-force transmission path from the motor 21 to the combined force member 29, the reduction gear 36 including small-diameter and large-diameter gears 36c and 36d that serve as a plurality of reduction gears, and small-diameter and large-diameter support shafts 36a and 36b that serve as reduction gear support shafts supporting the small-diameter and large-diameter gears 36c and 36d. In the present embodiment, between the large-diameter gear 36d and the large-diameter support shaft 36b, a one-way clutch 37 for interrupting a human driving force is provided to prevent transmission of a human driving force from the combined force member 29 to the motor 21.

With this configuration, if the battery 12 runs out and the pedals 8 are pressed without an auxiliary driving force outputted from the motor 21, a human driving force rotates the small-diameter gear 36c, the small-diameter support shaft 36a, and the large-diameter support shaft 36b but does not rotate the large-diameter gear 36d and a rotating shaft 21a and a rotor 21b of the motor 21. Thus, it is not necessary to apply an excessive force to the pedal 8 (a so-called drag resistance can be considerably reduced). In comparison with the conventional single-shaft motor drive unit shown in FIG. 13, a human driving force does not rotate the large-diameter gear 36d and the rotating shaft 21a of the motor 21, reducing a force for rotating the pedals 8 accordingly.

Figure 11:
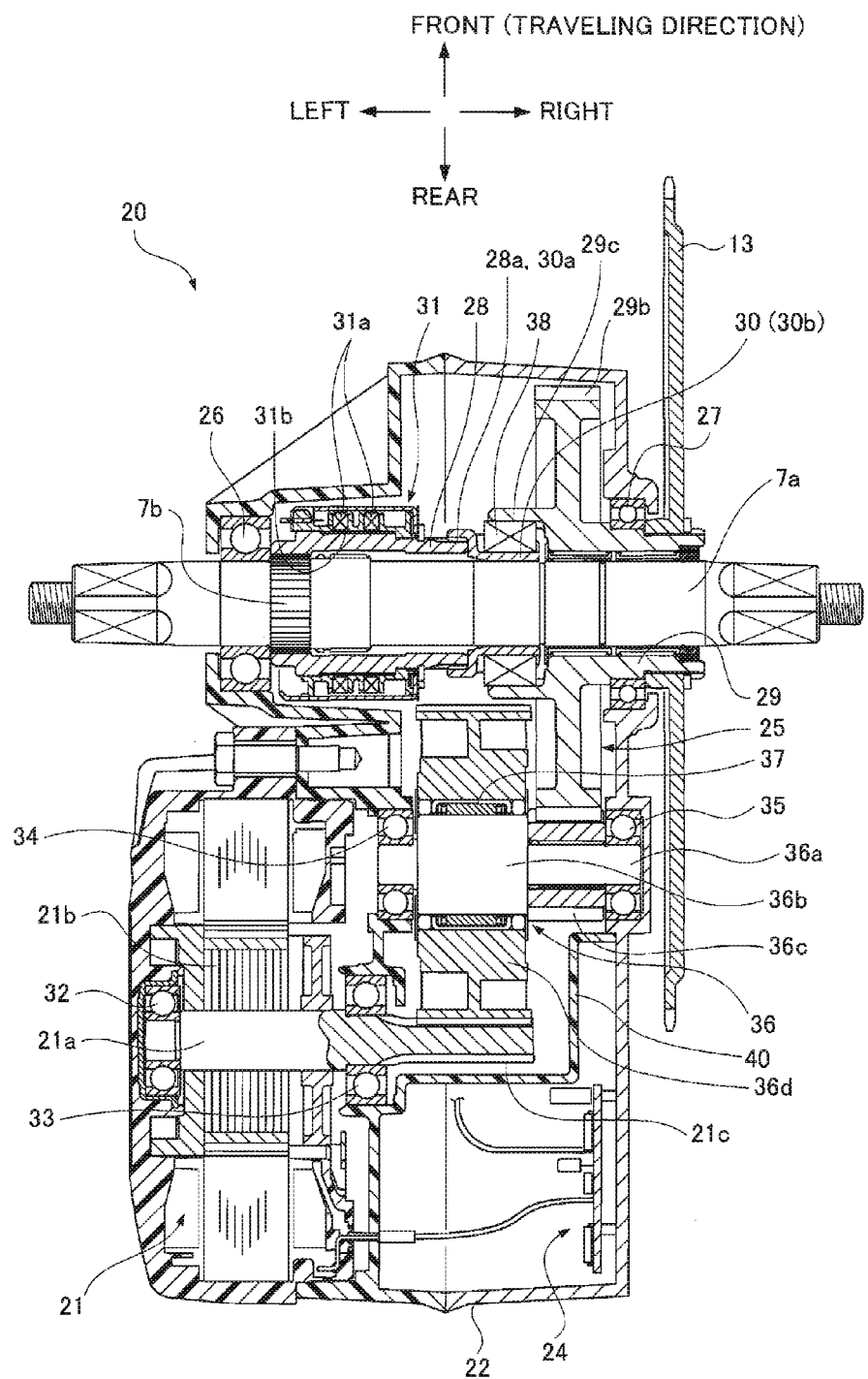
FIG. 11 is a cross-sectional plan view showing a modification of the motor drive unit of the power-assisted bicycle according to the second embodiment of the present invention.
Figure 12:
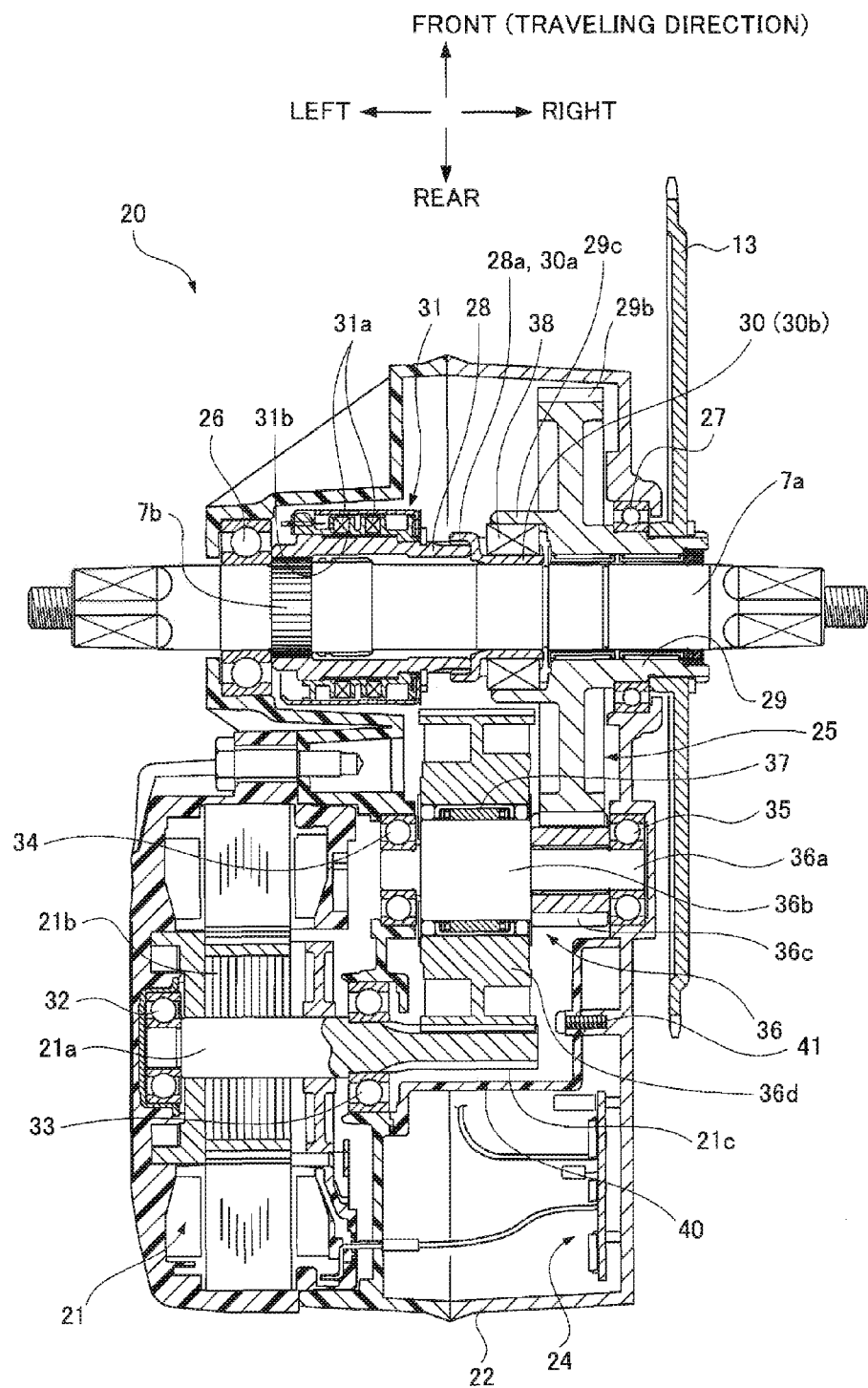
FIG. 12 is a cross-sectional plan view showing a modification of the motor drive unit of the power-assisted bicycle according to the second embodiment of the present invention.
Figure 13:
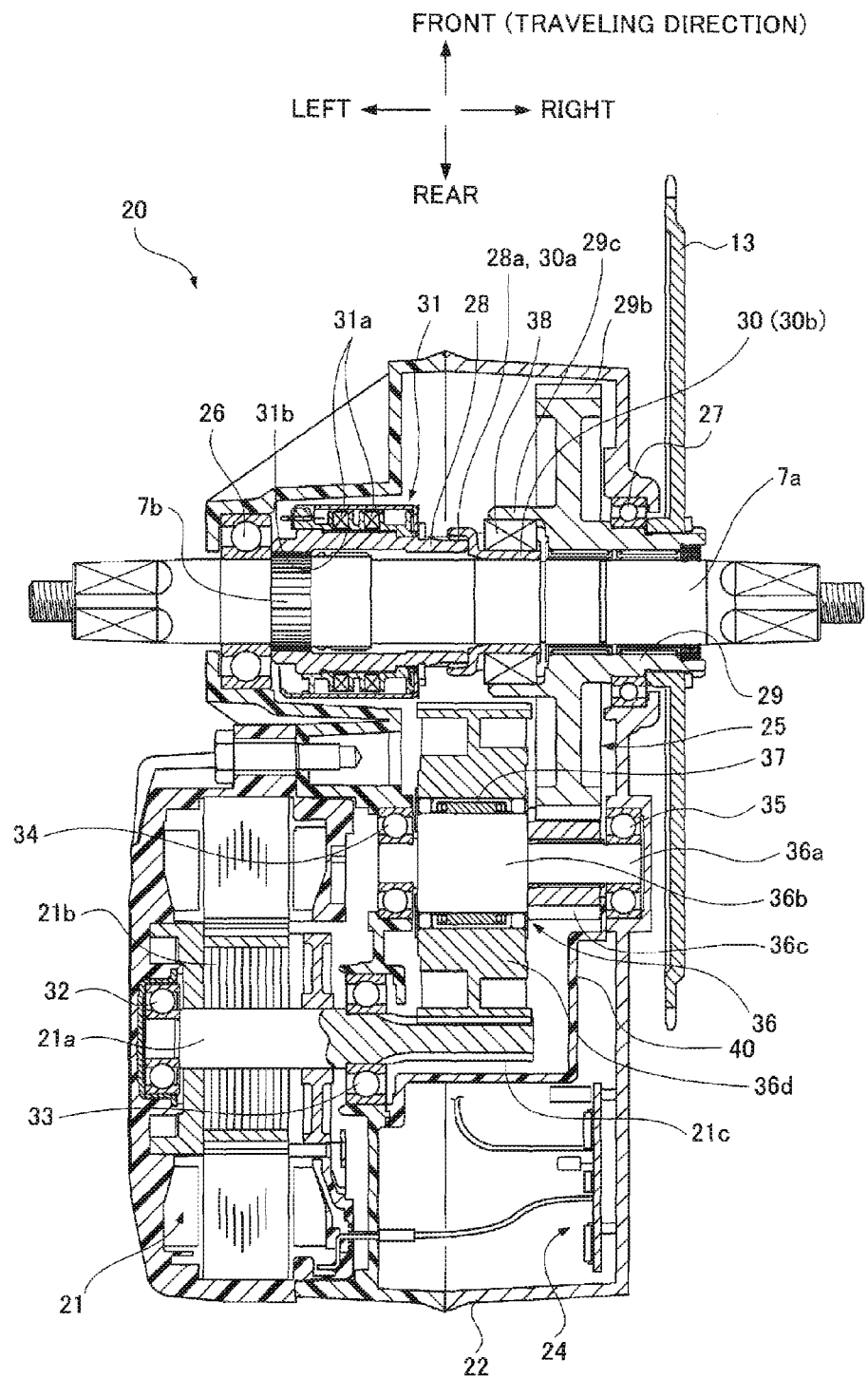
FIG. 13 is a cross-sectional plan view showing a modification of the motor drive unit of the power-assisted bicycle according to the second embodiment of the present invention.
Figure 14:
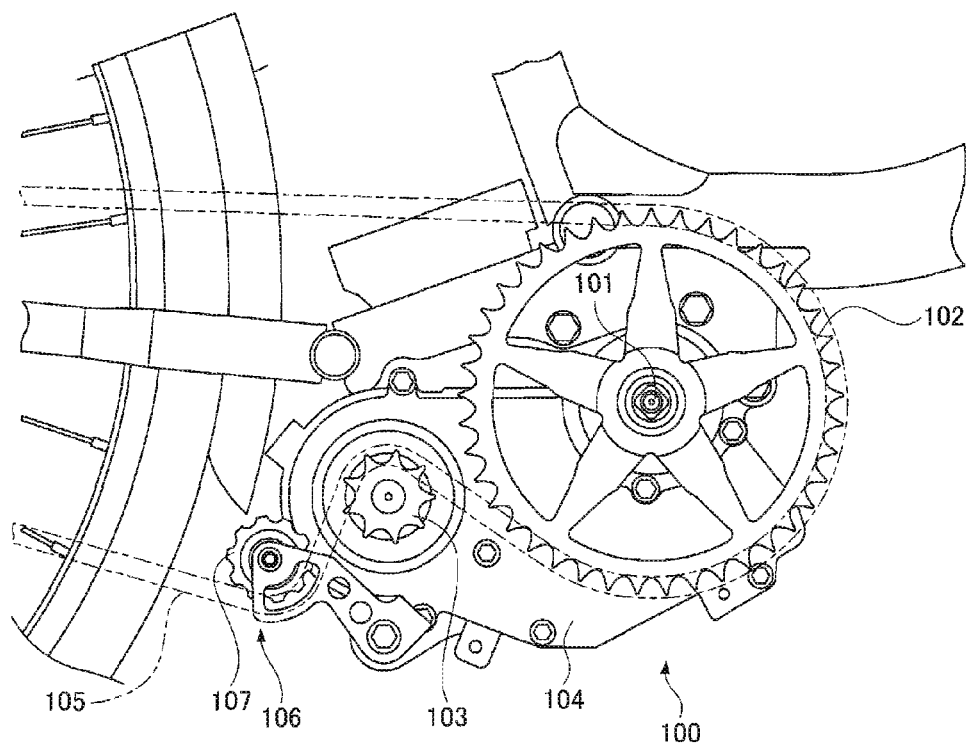
FIG. 14 is a side view showing a double-shaft motor drive unit and a portion near the motor drive unit in a conventional power-assisted bicycle.
Figure 15:
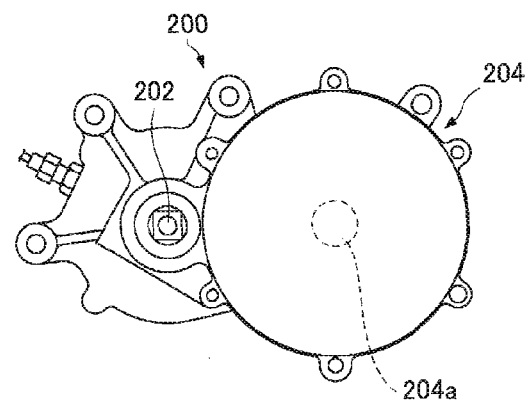
FIG. 15 is a side view showing a single-shaft motor drive unit in the conventional power-assisted bicycle.
Figure 16:
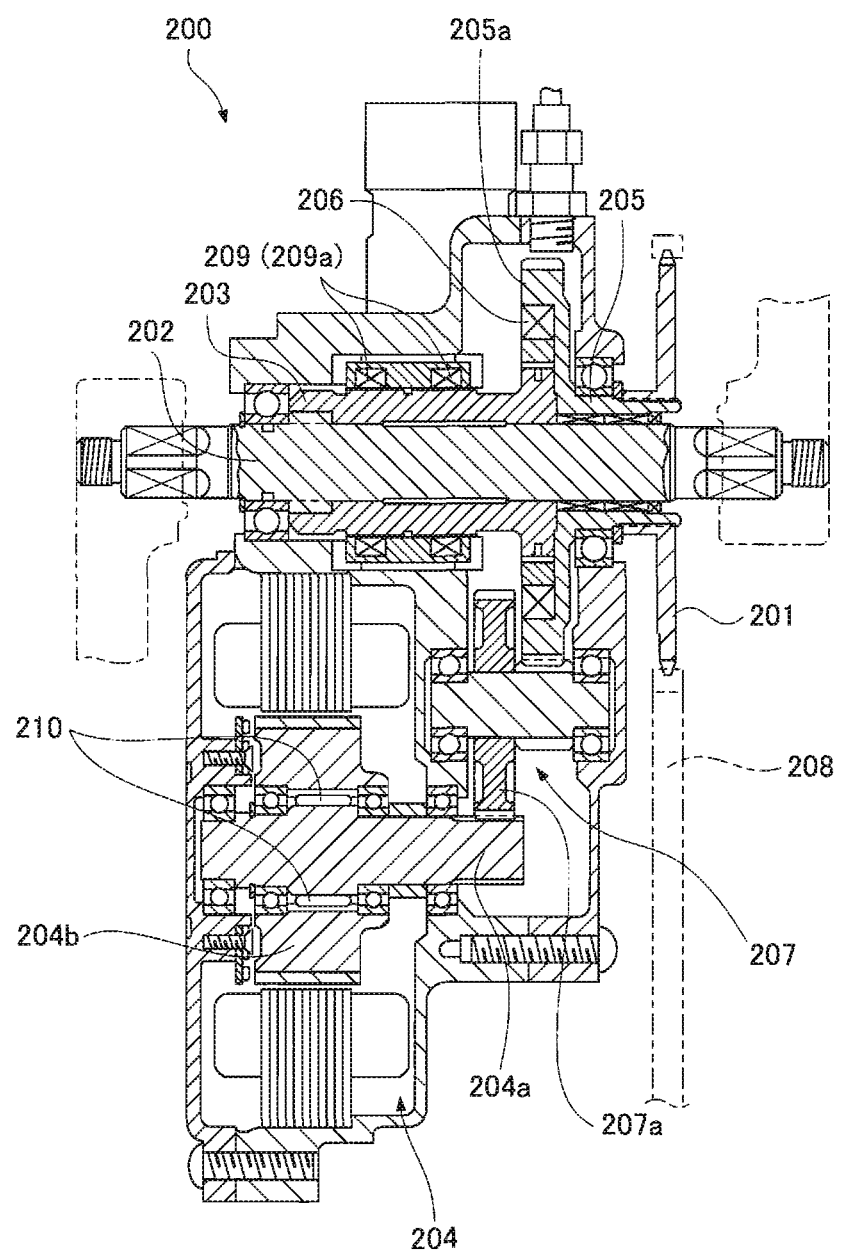
FIG. 16 is a plane section showing the single-shaft motor drive unit in the conventional power-assisted bicycle.
Figure 17:
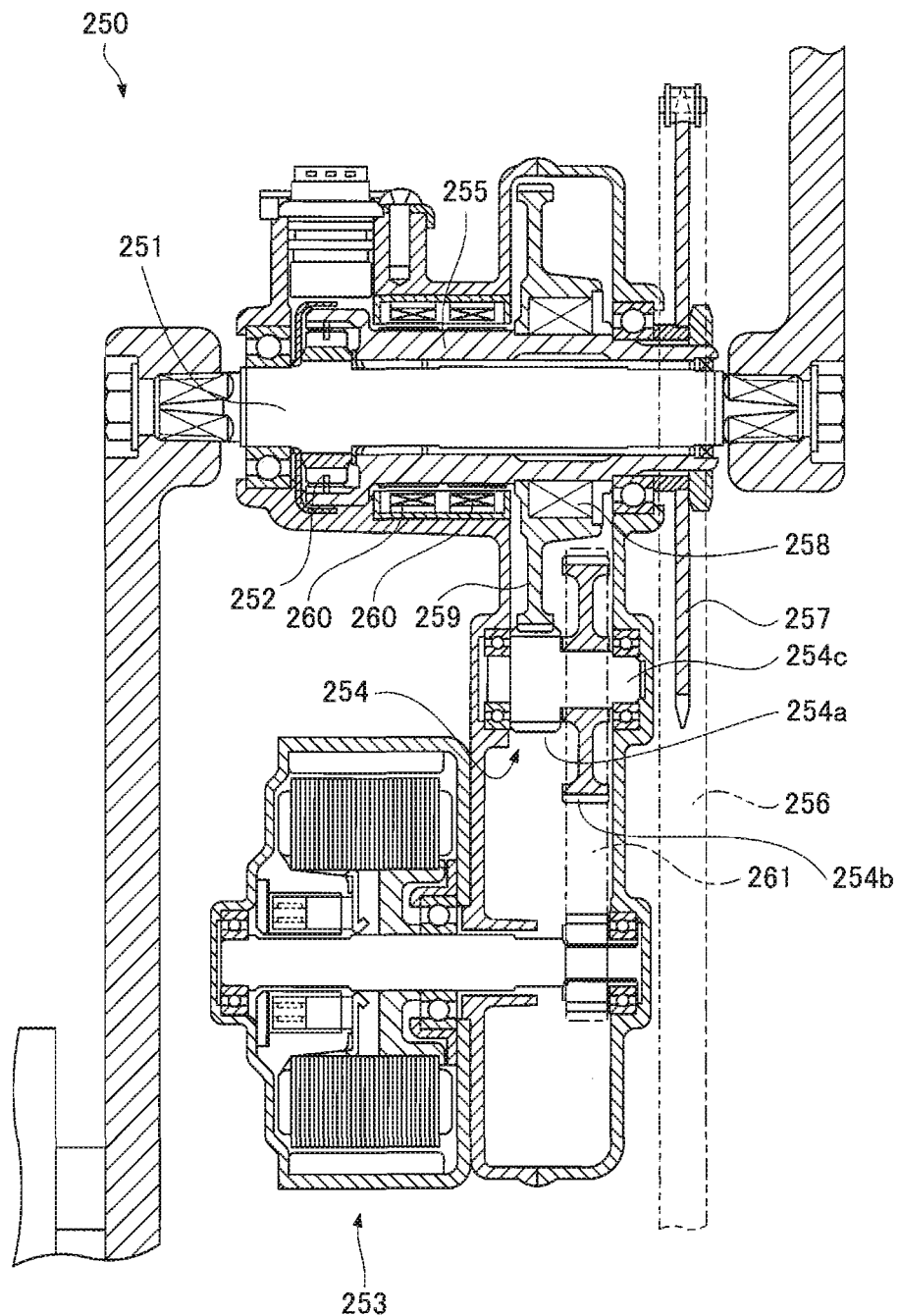
FIG. 17 is a plane section showing a single-shaft motor drive unit in another conventional power-assisted bicycle.

As shown in FIGS. 11 to 13, oil (grease) for smooth engagement is filled to a portion of engagement between the gears provided in the deceleration mechanism 25. This configuration preferably includes an oil guard cover 40 for preventing the oil from being sprayed to the outside of a control unit 24. As show in FIG. 11, the oil guard cover 40 may be integrated with a unit case 22 of the motor drive unit 20. Alternatively, as shown in FIGS. 12 and 13, the oil guard cover 40 may be a separate part of the unit case 22 of the motor drive unit 20 and be assembled into the unit case 22. In FIG. 12, the oil guard cover 40 is fixed to the unit case 22 with a screw 41. In FIG. 13, one end of the oil guard cover 40 is locked by being held between the small-diameter gear 36c and a bearing 35 while the other end of the oil guard cover 40 is attached in engagement with the unit case 22.

This configuration can prevent oil of the deceleration mechanism 25 from being sprayed to the control unit 24, achieving higher reliability. Moreover, the oil guard cover 40 separates the control unit 24 from a portion where the motor 21 and the deceleration mechanism 25 are provided. With this configuration, heat from the motor 21, which is likely to generate heat, is hardly transmitted to the control unit 24, thereby preventing the adverse effect of heat from the control unit 24 so as to improve the reliability. The oil guard cover 40 integrated with the unit case 22 can reduce the number of components as compared with the oil guard cover 40 separated from the unit case 22. If the oil guard cover 40 is a separate part of the unit case 22, although the number of components increases, the deceleration mechanism 25 can be efficiently assembled while the oil guard cover 40 is detached.

In the present embodiment, a front derailleur is not attached and the single driving sprocket 13 (single stage) is provided. The present invention is not limited to this configuration. A front derailleur may be attached with large and small driving sprockets.

Moreover, the present invention is applicable to a variety of power-assisted bicycles that can travel with a combination of a human driving force generated by a pedal force from a pedal and an auxiliary driving force generated by a motor.

The invention claimed is:

1. A power-assisted bicycle capable of traveling with a combination of a driving force from a pedal applied by a human and an auxiliary driving force generated by a motor,
    the power-assisted bicycle being configured such that a cylindrical power transmission member is disposed on an outer periphery of a crankshaft and configured to receive the driving force from the pedal, the power transmission member receiving the transmitted driving force from the pedal and having a magneto-striction generation portion of a torque sensor for detecting the driving force from the pedal,
    a combined force member that combines the driving force from the pedal transmitted through the power transmission member and the auxiliary driving force from the motor is disposed on the outer periphery of the crankshaft, and
    a resultant force of the driving force from the pedal and the auxiliary driving force that are combined by the combined force member is transmitted to a rear wheel through a driving force output wheel coaxial with the crankshaft and an endless driving force transmission member looped over the driving force output wheel,
    the power-assisted bicycle comprising:
    a deceleration mechanism disposed on an auxiliary-driving-force transmission path from the motor to the combined force member, the deceleration mechanism having a plurality of reduction gears and a reduction gear support shaft that supports the reduction gears,
    a first one-way clutch for interrupting a driving force from the pedal between one of the reduction gears and the reduction gear support shaft without transmitting a driving force from the pedal from the combined force member to the motor,
    an interlocking cylinder that serves as a separate part of the power transmission member between the power transmission member and the combined force member, the interlocking cylinder rotating integrally with the power transmission member in engagement with the power transmission member, and
    a second one-way clutch for interrupting the auxiliary driving force between the interlocking cylinder and the combined force member, the second one-way clutch preventing transmission of the auxiliary driving force from the combined force member to the power transmission member and the crankshaft, and
    the interlocking cylinder and the human-power transmission member are fit to each other via one of a serration part and a spline part.

2. The power-assisted bicycle according to claim 1, wherein the deceleration mechanism comprises a reduction gear having a reduction large-diameter gear, a reduction gear large-diameter support shaft, a reduction small-diameter gear, and a reduction gear small-diameter support shaft, and
    the first one-way clutch is disposed between the reduction large-diameter gear and the reduction gear large-diameter support shaft.

3. The power-assisted bicycle according to claim 2, wherein the reduction small-diameter gear and the reduction gear small-diameter support shaft are separate parts, the reduction small-diameter gear being integrated with the reduction gear small-diameter support shaft.

4. The power-assisted bicycle according to claim 1, wherein the deceleration mechanism comprises a reduction gear having a reduction large-diameter gear, a reduction gear large-diameter support shaft, a reduction small-diameter gear, and a reduction gear small-diameter support shaft, and the first one-way clutch is disposed between the reduction small-diameter gear and the reduction gear small-diameter support shaft.

5. The power-assisted bicycle according to claim 1, further comprising a motor drive unit including the motor, the combined force member, the deceleration mechanism, and a control unit, and the motor and the control unit overlap each other in side view and are opposed to each other in a width direction in front view.

6. The power-assisted bicycle according to claim 1, wherein the deceleration mechanism comprises a reduction gear having a reduction large-diameter gear, a reduction gear large-diameter support shaft, a reduction small-diameter gear, and a reduction gear small-diameter support shaft, the reduction gear large-diameter support shaft and the reduction gear small-diameter support shaft are integrally formed or integrally rotated as a reduction gear support shaft, and the reduction gear support shaft is rotatably supported by bearings on two ends of the reduction gear support shaft in an axial direction.

7. The power-assisted bicycle according to claim 1, further comprising an oil guard cover that prevents oil filled to a portion of engagement between the gears provided in the deceleration mechanism from being sprayed to outside.

8. The power-assisted bicycle according to claim 7, wherein a control unit for the motor is provided, and the oil guard cover is disposed at a boundary between the deceleration mechanism and the control unit.

9. The power-assisted bicycle according to claim 8, wherein the motor, the combined force member, the deceleration mechanism, and the control unit are assembled into a motor drive unit and the oil guard cover is integrated with a unit case of the motor drive unit.

10. The power-assisted bicycle according to claim 8, wherein the motor, the combined force member, the deceleration mechanism, and the control unit are assembled into a motor drive unit, and the oil guard cover is a separate part of a unit case of the motor drive unit and is assembled into the unit case.

* * * * *